United States Patent [19]
Zavracky

[11] Patent Number: 5,909,280
[45] Date of Patent: Jun. 1, 1999

[54] METHOD OF MONOLITHICALLY FABRICATING A MICROSPECTROMETER WITH INTEGRATED DETECTOR

[75] Inventor: Paul M. Zavracky, Norwood, Mass.

[73] Assignee: Maxam, Inc., Wilmington, Del.

[21] Appl. No.: 08/197,112

[22] Filed: Feb. 16, 1994

Related U.S. Application Data

[63] Continuation-in-part of application No. 07/356,352, Jan. 22, 1992, abandoned.

[51] Int. Cl.$^6$ ..................................................... G01B 9/02
[52] U.S. Cl. .......................... 356/352; 356/345; 356/346
[58] Field of Search ................... 356/346, 345, 356/352

[56] References Cited

U.S. PATENT DOCUMENTS

| | | | |
|---|---|---|---|
| 2,937,562 | 5/1960 | Robillard . | |
| 4,756,606 | 7/1988 | Jewell et al. | 356/352 |
| 4,772,786 | 9/1988 | Langdon | 250/231 |
| 4,825,262 | 4/1989 | Mallinson | 356/352 |
| 4,859,060 | 8/1989 | Katagiri et al. | 356/352 |
| 4,973,131 | 11/1990 | Carnes | 350/166 |
| 5,039,201 | 8/1991 | Liu | 356/352 |
| 5,142,414 | 8/1992 | Koehler | 356/352 |
| 5,218,422 | 6/1993 | Zoechbauer | 356/352 |
| 5,218,426 | 6/1993 | Hall et al | 356/352 |
| 5,468,620 | 11/1995 | Molloy et al. | 356/352 |

OTHER PUBLICATIONS

U.S. Ser. No. 07/824837, Zavracky et al.
Jerman et al., "A Miniature Fabry–Perot Interferometer Fabricated Using Silicon Micromachining Techniques" (1988), pp. 16–18.

*Primary Examiner*—Robert Kim
*Attorney, Agent, or Firm*—Hamilton, Brook, Smith & Reynolds, PC

[57] ABSTRACT

The present invention relates to microfabricated spectrometers including methods of making and using same. Microspectrometers can be formed in a single chip in which detectors and light sources can be monolithically integrated. The microspectrometer can be integrated into a sensor system to measure the optical and physical properties of solids and fluids.

19 Claims, 14 Drawing Sheets

6 x 6 Spectrometer Array

METHOD OF MONOLITHICALLY FABRICATING A MICROSPECTROMETER WITH INTEGRATED DETECTOR

This is a continuation-in-part application of U.S. Ser. No. 07/356,352 filed on Jan. 22, 1992, abandoned on Jul. 25, 1994 the contents of which are incorporated herein by reference.

BACKGROUND OF THE INVENTION

A monochrometer is an optical instrument that can select a narrow band of wavelengths of light from a source which contains a broader spectrum. Spectrometers are the combination of a monochrometer and a detector such that the output of a spectrometer is an electrical signal which is proportional to the intensity of light in the selected narrow band. Monochrometers and spectrometers are used in many important commercial and defense applications, some of which include chemical analysis by optical absorption, emission line characterization, thin film thickness analysis, and optical characterization of mirrors and filters.

The optical properties of an unknown material can reveal important information leading to a determination of its composition or physical properties. For instance, spectral analysis of optical emission lines are used to determine the atomic species of gaseous material. A second example is the routine use of optical spectra by the semiconductor industry to determine the thickness of multilayer thin films. These measurements are made with instruments incorporating optical spectrometers. A typical spectrometer is a precision instrument that usually consists of an entrance slit, a prism or grating, a couple of mirrors or lenses, and an exit slit. Lenses would normally be used to focus the light into the entrance slit and from the exit slit onto a detector. To scan through the spectrum, the grating or prism is rotated mechanically. The grating or prism separates the light into its spectral components and these are selected by the exit slit and measured with an optical detector.

The conventional optical spectrometer is a large, expensive, precision instrument. Its quality is characterized by its ability to separate spectral components or in other words, by its resolution. Analytical equipment that incorporates optical spectrometers are by nature expensive and therefore relegated to applications that can justify the expense. While current spectrometers perform their function well, broader application of optical measurement techniques would be achieved with a small and less expensive alternative.

SUMMARY OF THE INVENTION

The present invention relates to a miniature optical spectrometer and methods for manufacturing and using such an instrument. The process takes advantage of microfabrication techniques to produce a microspectrometer that incorporates a wavelength selective micromechanical component and an optical detector. Microspectrometers offer significant advantages over existing instruments including significantly smaller size, lower cost, faster data acquisition rate, and much greater reliability. Because of these advantages, much broader application of optical measurement techniques can be achieved. The microspectrometer can also be built as a multisensor to measure fluid composition, pressure, mass loading transients and microscale turbulent properties of fluids. In these applications variations in the incoming optical signal from a light source are measured and correlated with the selected property or physical characteristic of the fluid being analyzed.

The microspectrometer consists of a mechanical bridge structure which is fabricated on a substrate. The bridge contains a region near its center in which an optical mirror is placed. The mirror is designed to be reflective over a broad range of wavelengths and is fabricated using standard optical thin film deposition techniques or techniques used in conventional microfabrication technology. The bridge extends over the substrate material upon which a second mirror with the same spectral response has been fabricated. The mirror on the bridge and the mirror on the substrate are separated by air, an inert gas, a fluid, or a vacuum in the gap. The combination of the two mirrors and the gap create a miniature Fabry-Perot cavity. Providing an optical cavity where two mirrors are positioned adjacent to one another creates a spacing or gap such that at least one of the mirrors become transmissive over a narrow band of wavelengths. The band over which the mirrors become transmissive depends upon the spacing and the refractive index of the material, if any, located within the gap.

The Fabry-Perot cavity therefore acts as an interference filter which permits the transmission of a narrow band of wavelengths as determined by the quality of the mirrors and the width of the gap. If the gap width is varied, the center frequency for the transmitted light also varies. Moving the bridge relative to the substrate varies the gap between the bridge and the substrate, thus changing the frequency of the transmitted light.

In a further enhancement, a detector can be placed between the lower mirror and the substrate. The detector would be a photosensitive structure with sensitivity in the spectral region transmitted by the mirrors. It could be configured into a photoconductive or photovoltaic sensor with its output proportional to the intensity of the light transmitted by the Fabry-Perot cavity. Certain preferred embodiments employ a charge coupled device (CCD) as a detector.

A preferred embodiment of the spectrometer includes, a means of moving the bridge relative to the substrate. One technique would be to incorporate electrostatic force plates. They can be fabricated in a transparent conductive material and be part of the lower mirror structure or, can be separate and to the sides of the lower mirror structure. In the latter case, the bridge length must be sufficient to accommodate the force plates. If an electric field is applied between the force plates and the bridge, a resultant force is produced in the bridge which pulls the bridge toward the substrate. This force is roughly proportional to the square of the applied electric field. These force plates can be used to move the bridge in a controlled manner over a range equal to about $\frac{1}{3}$ of the total gap between the force plate and the bridge. Motion beyond this point results in unstable behavior which tends to pull the bridge down to the force plates suddenly. To be safe, the motion of the bridge should be restricted to a value less than $\frac{1}{3}$ of the gap for static DC operation. If an AC field is applied to the force plates through a series capacitor, it is not necessary to restrict the range of motion to $\frac{1}{3}$ of the gap spacing, thereby permitting larger controlled motions of the bridge. In a dynamic sense, the bridge can be made to resonate at one of its resonant frequencies by applying a time varying electric field with a frequency equivalent to that of the resonant frequency of the bridge. By making use of resonance, the bridge could be operated over greater excursions with a lower applied field.

The position of the bridge relative to the substrate or in other words, the gap spacing controls the wavelength of the light transmitted into the detector. It is therefore important to monitor the bridge to substrate spacing. This can be accomplished by using a capacitive detection technique. A set of electrodes is placed under the bridge and the capacitance between the electrodes and the bridge is measured. It is inversely proportional to the gap spacing. This measurement can be made using a number of electronic techniques that include electronic bridge circuits, oscillators and switched capacitor circuits.

In use, a light source consisting of a range of wavelengths whose distribution and amplitudes are to be determined is introduced to the spectrophotometer from the top of the bridge. The bridge is excited into resonance by the application of an electric field. The selected wavelength of the Fabry-Perot cavity varies in time synchronously with the bridge motion. The position of the bridge is monitored with the position detectors. This output along with the output from the detector provides all the information needed to determine the spectral distribution.

This bridge positioning and detection subsystem also has non-optical sensor applications. As discussed in a later section, it has all of the hardware required for a microscale force balance system. With modified electronics, and use of a diaphragm bridge, the microspectrometer can be extended into a multisensor capable of measuring local mechanical and electric forces in the media which is being optically monitored.

DETAILED DESCRIPTION OF THE INVENTION

Figure 1:
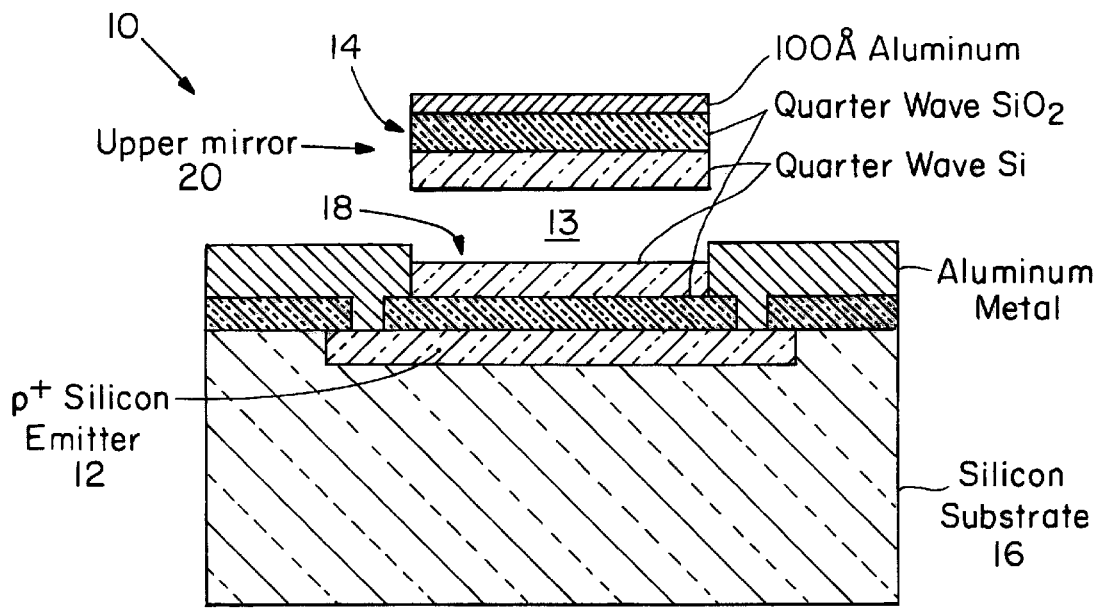
FIG. 1 is a cross-sectional view of the microspectrometer incorporating the features of the present invention.

FIG. 1 shows a preferred embodiment of the invention including a simplified cross-section of a visible microspectrometer 10. To make a spectrometer, two important elements are required; a light detector 12 (the $p^+$/n-junction diode) and a wavelength selective element including an upper mirror, gap and lower mirror. In this proposal, a silicon photodiode is the preferred light detector for a spectrometer designed to function over the visible spectrum. Other choices of detector would extend the range into the infrared or ultraviolet. The photodiode can be fabricated in or on a silicon substrate 16 by doping the n-substrate with boron to create a p-n junction. The choice of silicon as the substrate material allows the incorporation of a sense amplifier and drive electronics on the same chip.

Figure 2:
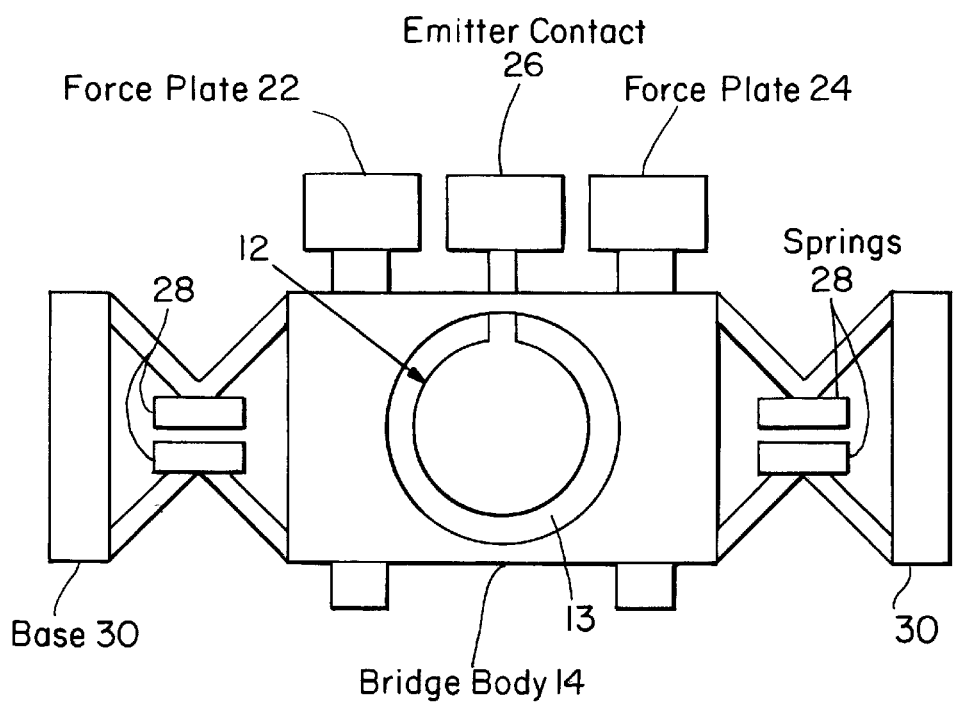
FIG. 2 is a schematic top view of the microspectrometer incorporating the features of the present invention.

Conventional spectrometers use prisms or gratings as the wavelength selective element. In the microspectrometer, the wavelength selective element is essentially a Fabry-Perot cavity which consists of an upper mirror 14, an air gap 13, and a lower mirror 18. In a simple embodiment, the upper mirror might consist of 3 quarter wave layers of silicon and silicon dioxide. The air gap normal spacing would be half-wave and the lower mirror would consist of quarter wave layers of silicon and silicon dioxide on the $p^+$ emitter of the photodiode. Including the substrate, this filter is referred to herein as a seven (7) layer filter. The upper mirror is supported by a bridge structure as shown in the top view of FIG. 2. The bridge structure is attached to the substrate at its bases. In its center a multilayer interference mirror has been fabricated. The spring sections of the bridge structure minimize stresses on the mirror. Below the bridge at its center is a silicon photodiode which is used as the detector. On either side of the diode, an electrostatic force plate has been placed. The bridge can be driven by any number of techniques including electrostatics, thermal and piezoelectric effects. The perceived optimum configuration would be one in which the bridge was caused to oscillate at its fundamental frequency. The bridge could span electrodes 22 and 24 on either side of the photodiode (as shown in FIG. 2) or could use the diode's emitter contact 26 as one plate of a variable capacitor. The other plate would be the bridge itself. A circuit is fabricated on the same chip which would employ this capacitor as an element in the feedback loop of an integrated oscillator. The position of the bridge relative to the diode would be proportional to the value of the capacitor just described and would therefore be known at all times. Once the spectrometer was calibrated, this position would be directly related to the wavelength of the light selected by the spectrometer.

The spectrometer described above is a miniature version of a Fabry-Perot scanning interferometer. Previous spectrometers have been constructed using conventional machining techniques and very high quality optical surfaces. Earlier methods of fabrication could not provide the substantial reduction in size provided by the methods set forth herein. For example, single devices can range in surface area from about 10 square microns to 1 square centimeter and preferably between 100 square microns and 1000 square microns. In addition, ordinary optical flat of ¼ wavelength is not sufficient for precise applications. For high precision measurements, 1/20 to 1/100 wavelength is required. The most significant advantage of the Fabry-Perot interferometer relative to prism and grating spectrometers is that the resolving power can exceed 1 million or between 10 and 100 times that of a prism or grating. Thus, the advantages of miniaturization include reduced vibration sensitivity, improved durability, reduced cost and size as well as higher scan speed.

In the schematic diagram shown in FIG. 1, an $p^+$ emitter layer is diffused into an n-type silicon substrate to create a photodiode 12. The $p^+$ layer itself becomes part of the lower interference mirror 18, which includes a quarter wave $SiO_2$ layer and a quarter wave silicon layer. An air gap width of half the center wavelength must be created. Above this a second interference mirror 14 consisting of quarter wave silicon and silicon dioxide layers must be created. Other material pairs can be used, where one film has a high index of refraction, such as silicon, and the other a low index material, such as silicon dioxide. An example of such a high/low index of refraction pair of materials is zinc sulfide and magnesium fluoride. This pair is widely used in commercial optical interference filters. In conventional interference filter designs, the center layer would also be a low index material. In this filter, that material is air which effectively has an index of 1.0.

The number of layers in the mirrors determine their maximum reflectance. The greater the number of layers, the narrower the band width of the interference filter. In a preferred embodiment, a seven layer interference filter has been used. The performance of this filter can be analyzed using a matrix method to determine the optical transmission and reflection. The method used to create the curves shown in FIGS. 3A and 3B takes into consideration the index and absorption of all the layers. In this case, the indices and absorption coefficients of all the layers are indicated below along with the thicknesses of each layer.

| Layer | Index | Absorption | Thickness |
|---|---|---|---|
| Silicon | 3.85 | 0.02 | Substrate |
| Silicon Dioxide | 1.45 | 0.0 | ¼ wave |
| Silicon | 3.85 | 0.02 | ¼ wave |
| Air | 1.0 | 0.0 | ½ wave |
| Silicon | 3.85 | 0.02 | ¼ wave |
| Silicon Dioxide | 1.45 | 0.0 | ¼ wave |
| Silicon | 3.85 | 0.02 | ¼ wave |

Figure 3A:
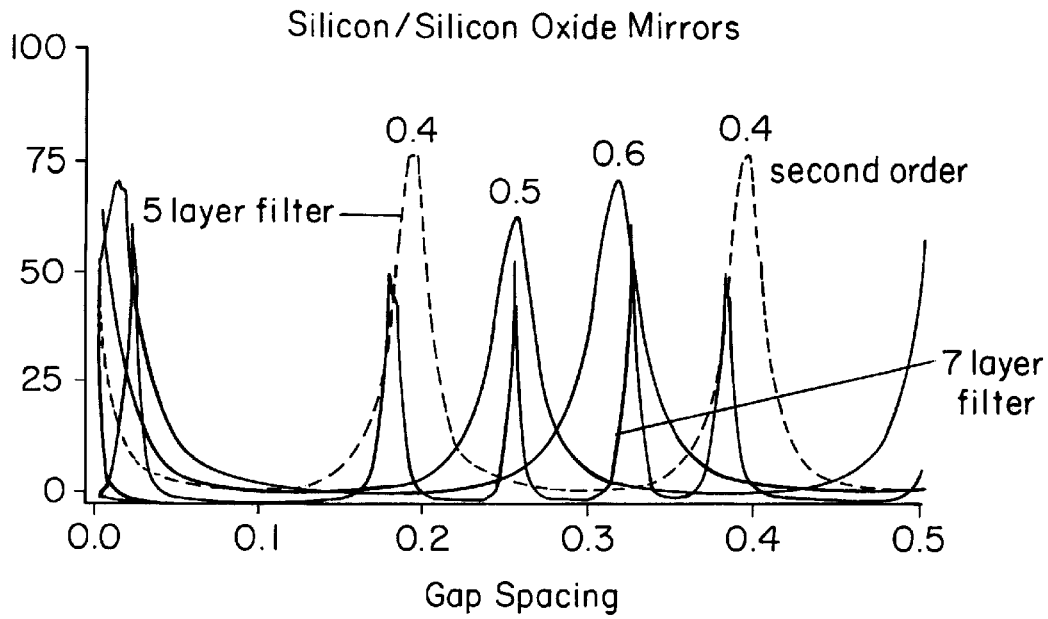
FIGS. 3A–3B are output waveforms associated with the microspectrometer.
Figure 3B:
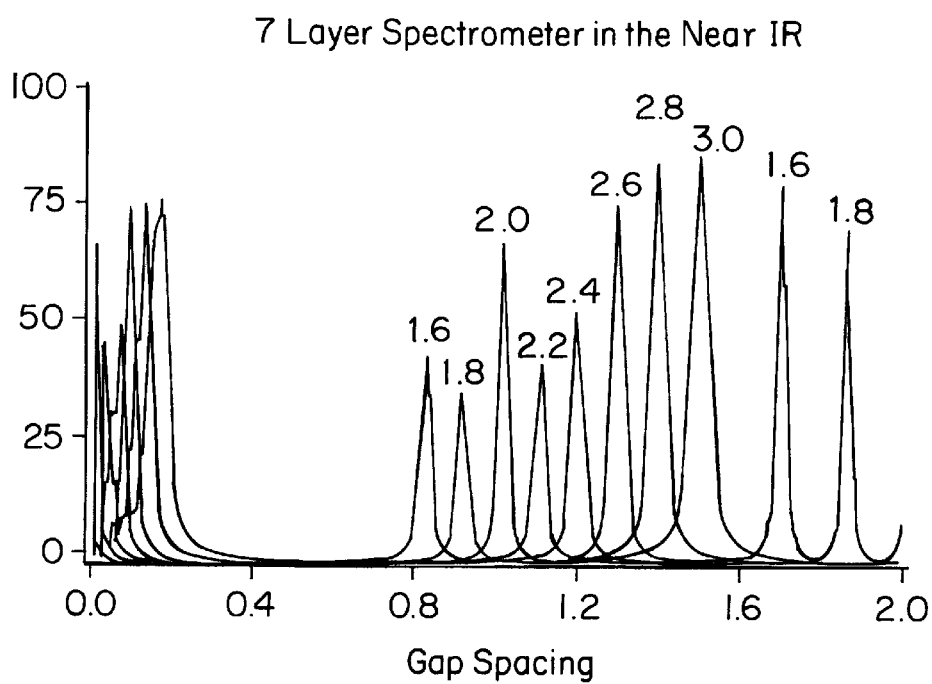

These numbers were used and the transmission of the filter was calculated as a function of the thickness of the air gap. The transmission represents the amount of light that enters the photodiode to be collected and converted to an electrical signal. A center wavelength of 0.5 microns was chosen. FIG. 3A shows the results of these calculations including a graph of the transmission versus the $SiO_2$ gap spacing for $Si/SiO_2$ mirrors with 5 and 7 layers. Each peak is the response of the spectrometer to a monochromatic source of the indicated wavelength. The narrower peaks show the improvement in the resolution possible with additional filter layers (fwhm=6.25 nm @ lambda=0.5 microns). Note first the curve representing the transmission when the wavelength is set to 500 nm. In this case, the curve peaks at exactly 250 nm of separation between the upper mirror and the lower mirror or at precisely ½ the center frequency for the filter as expected. It should be noted that there are second order responses at large gap spacing and zeroth order peaks at small spacing. Two other curves show the results if the wavelength is set to 400 nm and 600 nm. In these cases the peak moves in the direction expected, but the spacing of the air gap does not correspond to half the optical wavelength. In fact, the shift in the position of the peak is slightly greater than might be expected. The fact that the second order peak corresponding to 400 nm is approaching the primary peak corresponding to 600 nm suggests that the dynamic range of the spectrometer will need to be limited in order to avoid spurious results. FIG. 3B shows the seven layer spectrometers response to near infrared light. These spectrometers will begin to develop interference with the second order fringes at about ½ the minimum wavelength leading to a dynamic wavelength range of 2.

Based on these results, the full width half maximum of the transmitted output is approximately 1/12th of the spacing between the peaks. This indicates a resolution limit for this spectrometer of approximately 16 nm. This result is not as good as that available from conventional spectrometers which would typically have a resolution exceeding 2 nm. In FIG. 3A, the results for a five layer spectrometer are shown for comparison.

The resolving power of a Fabry-Perot spectrometer can be expressed as $$RP = N(\pi \sqrt{R} / (1 - R)$$

where R is the reflectivity of the mirrors and $N=2nd/\lambda_0$ with n the index of refraction and d the spacing between the mirrors and $\lambda_0$ is the center wavelength. This analysis indicates that a seven layer mirror centered at 0.5 $\mu$m will have a reflectivity of approximately 99%. Use of the formula above would result in an estimate of the resolving power, RP=310. By definition RP=$\lambda/d\lambda$ and the predicted resolution at 0.5 $\mu$m is 16 nm. A typical 30 layer interference mirror would have a reflection exceeding 0.999 and in this application provides a resolving power in excess of 3000, and a resolution of approximately 1.6 nm.

The optical and dimensional properties of the layers vary with temperature so resolution will be degraded in applications which are not temperature controlled. This is conveniently addressed by incorporating a temperature sensor into the device. This measurement allows the optical signal to be temperature compensated with the appropriate signal processing. Many types of temperature sensors can be employed depending on the specific temperature range, sensitivity and linearity desired for a given application. Examples include transistor and diode structures, deposited thin film resistors and diffused or implanted resistors.

Three fundamental steps are involved in the fabrication of a microspectrometer. These are detector fabrication, bridge/mechanical fabrication and interference mirror fabrication. The detector chosen depends among other things on the wavelength region desired. For the purposes of example, consider the design of a microspectrometer for the visible spectrum and a second for the near infrared. Silicon photodiodes can be the optimum choice for a visible spectrometer, owing to their wavelength sensitivity and the ease with which they can be fabricated and incorporated into the structure. Other detectors can be used including deposited photoconductors, phototransistors, and avalanche photodiodes.

A number of different micromachining techniques can be used to fabricate the bridge structure. These include CVD deposition of polysilicon or silicon nitride. An alternative approach is to use electroplating to deposit the bridge structure. Nickel bridges can be used in one embodiment. Nickel plating requires a special plating container, equipped with temperature control and filtration.

The final processing area relates to the fabrication of the mirror. This involves the deposition of optical quality layers. These layers must be deposited on the photodiode or detector surface, and in the hole at the center of the bridge structure. The preferred methods of deposition are by evaporation or by sputtering. Both processes are well characterized and understood by the industry. However, the optical properties of materials can vary as a function of the deposition techniques. In the optical coatings industry, extensive use of thickness monitoring equipment insures the correct optical thickness. Generally, a spectrometer is used to provide monochromatic light through a series of mirrors onto the sample surface and back to a detection system. The amplitude of the reflected or transmitted light from or through the sample is monitored. For a transmission sample, the transmission of the uncoated specimen will be high. As the deposition proceeds, the transmitted light amplitude decreases until it reaches a minimum at ¼ wave. An operator can therefore monitor the deposition at the desired wavelength and optimize the coating for ¼ wave or any desired multiple.

Figure 4A:
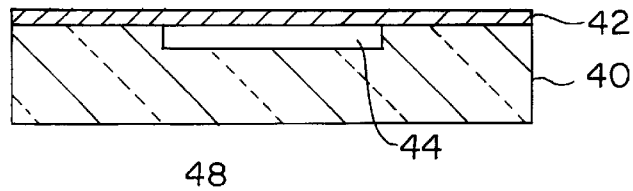
FIGS. 4A–4G show a process for fabricating microspectrometers.
Figure 4B:
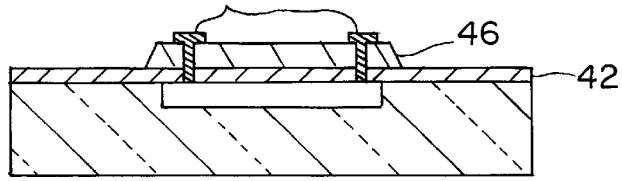
Figure 4C:
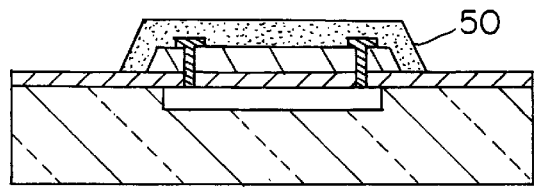

In FIGS. 4A–4G a suggested process is outlined for the microspectrometer. In this process, a silicon photodiode 44 is first fabricated in the silicon substrate 40 in FIG. 4A. It must be oxidized, preferably with a quarter-wave of silicon dioxide 42, and then coated, preferably with a quarter-wave polysilicon layer 46 as shown in FIG. 4B. Metallization 48 for the top contact of the photodiode is then deposited. This completes the bottom mirror of the interference filter.

Figure 4D:
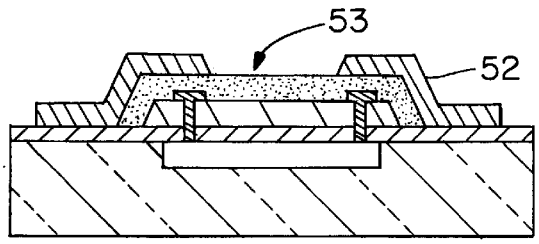
Figure 4E:
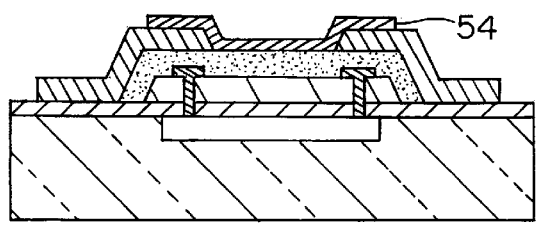
Figure 4F:
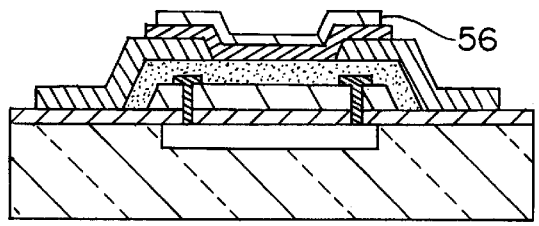
Figure 4G:
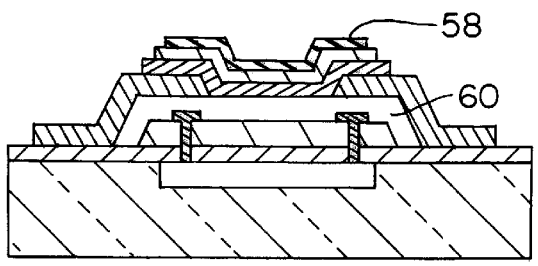

To create the bridge a nickel plating process can be used. In this process, a sacrificial layer 50 (FIG. 4C) is first deposited and patterned. Next, a plating base is deposited usually consisting of a nickel or gold thin film. Photoresist is spun on the wafer and patterned. Openings in the photoresist allow the plating base to be exposed to the plating solution during the plating process. The bridge structure 52 is defined with a hole 53 or opening above the photodiode (FIG. 4D). After the bridge is plated the photo resist is removed. The filter layers 54, 56, 58 (FIGS. 4E, 4F, 4G) which comprise the upper mirror are then deposited and patterned such that they remain attached to the bridge and fill the hole in the patterned nickel bridge. These layers will probably be evaporated or sputter deposited. Quarter-wave layers of silicon 54, 58 and silicon dioxide 56 are preferred. Once the upper filter has been completed, the sacrificial layer can be etched away leaving an air gap 60 (FIG. 4G). This process must take place without detriment to the other layers in the microspectrometer structure.

In certain applications it is desirable to incorporate signal conditioning electronics on the same substrate as the mechanical structure. In the case of the process described above, a silicon single crystal substrate was used as the starting material and therefore lends itself to the incorporation of on-chip electronics. The circuit can be fabricated prior to the fabrication of the micromechanical elements but would include the creation of the silicon photodiode. Also, circuitry employed in the analysis and comparison of measured spectra can also be integrated into the chip where appropriate. Circuit metallization must be compatible with the process used to create the micromechanical structure and will need to be protected from the etchant if aluminum is used for both the circuit metallization and the sacrificial layer. Alternatively, the circuit metallization could be used. Tungsten is another metal useful for circuit metallization.

As suggested above, spectrometers are used in a scan mode to obtain absorption versus wavelength spectra. Absorption represents an interaction between light and the medium and can be highly specific. For example, infrared light includes an electric field which is oscillating at frequencies of $10^{12}$–$10^{14}$ Hz. If a vibrational mode of a molecule produces an alternating electric field, it can absorb incident radiation, but only at that vibrational frequency. Polyatomic molecules have many vibrational modes at infrared frequencies. Similar principles apply at other wavelengths but the nature of the atomic or molecular energy states changes. For example, higher frequency (visible and ultraviolet) interactions usually involve outer electron transitions while lower frequency microwave absorption typically involves rotational modes. Examination of absorption (or reflection) spectra and identification of the major absorption (or reflection) peaks often allows the user to identify the components in a medium.

A different technique is usually employed for quantitative monitoring of a particular component of a sample being analyzed. In these applications, the scan mode is replaced by measurements made at a specific wavelength. The selected wavelength should be a characteristic absorption peak of the component and unaffected by interference from other components. Many factors affect absorption so the measured absorption is usually compared to a "baseline" measurement which is made in a nearby inactive part of the spectrum. Ratios of absorption peaks characteristic of two species in a mixture are also used.

The microspectrometer is ideally suited for relative measurements of this type because the moving bridge can be treated as a two state device. Most of the measurement errors (source and sensor, drift, different pathlengths and temperature, etc.) are eliminated because the same components are used for high rate measurements of both sample and baseline absorption. In two stage or multistage operation the device operates at a plurality of wavelengths. For example, it can oscillate between two stages or it can be sequentially operated through more wavelengths that can be selected by the user. Thus the relative amounts of two or more constituents of the sample can be determined by rationing the absorption or intensity at wavelengths that are characteristic of each constituent. This device eliminates the need for two wavelengths or the use of two filters with one device.

The small size and low unit cost of the microspectrometer makes array products practical. One implementation would utilize arrays of identical devices for pattern recognition, enhanced sensitivity and reliability-through-redundancy applications. Redundancy includes circuitry that places a second spectrometer element in the array on-line upon failure of another spectrometer element. The circuit can optionally identify failed components for the operator.

The microspectrometer design of the present invention is capable of producing spectrometers with a total area of 30 $\mu$m×30 $\mu$m and smaller. With such a small device, an array of spectrometers as shown in FIG. 6B which are similar to current photodiode arrays can be produced. This array can be used in a three dimensional mode in that it will not only provide two dimensional image information but will provide spectral information as well. Such arrays would be extremely useful for medical applications, target recognition in military applications and for environmental monitoring.

Figure 6A:
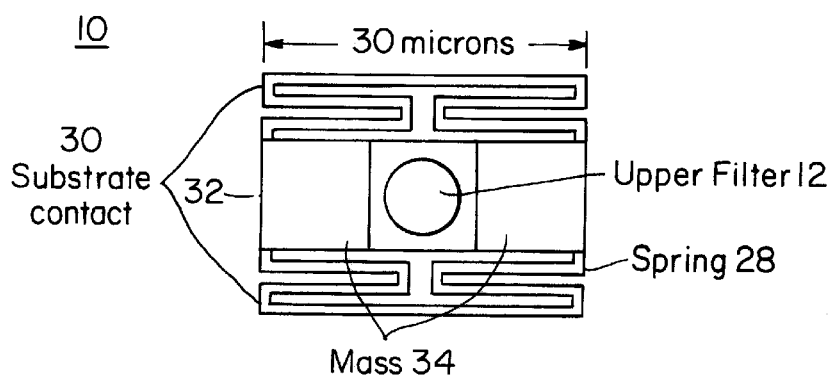
FIGS. 6A–6B show a schematic top view of the microspectrometer incorporating the features of an alternative embodiment.
Figure 6B:
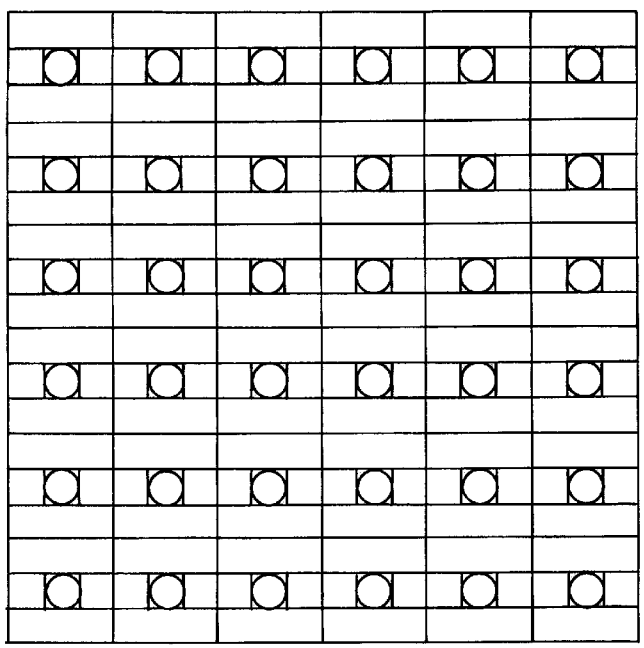

The basic design for the microspectrometer consists of a center plate 32 with two sections of increased mass 34 supported by four springs 28 as shown in FIG. 6A. The springs are fabricated in nickel using a selective plating process and are designed to provide minimum resistance to motion normal to the wafer but are significantly stiffer for motion in the plane of the wafer. The center section 34, which can contain regions with additional mass that is used to reduce the resonant frequency, includes a hole 12 in which the filter is placed. The springs 28 are fastened to the substrate 30 at the outer edges of the device. The mass is an electroplated gold layer which can be selectively plated after the springs have been defined. As described previously, the upper filter would be deposited in a hole at the center of the device. The nickel springs might be approximately 2 $\mu$m wide, approximately 30$\mu$ long (folded) and 0.5 $\mu$m thick. The gold layer is approximately 10 $\mu$m thick and about 10 $\mu$m on a side. Since gold has a density of 19.3 gm/cm3, the total mass of the mirror support is therefore about $$m=2*19.3 \text{ gm/cm3} * 10 \ \mu\text{m} * (10 \ \mu\text{m})^2 * 10^{-12} \text{ cm3}/\mu\text{m3}, = 3.86 \times 10^{-8} \text{ gm}.$$

Figure 7:
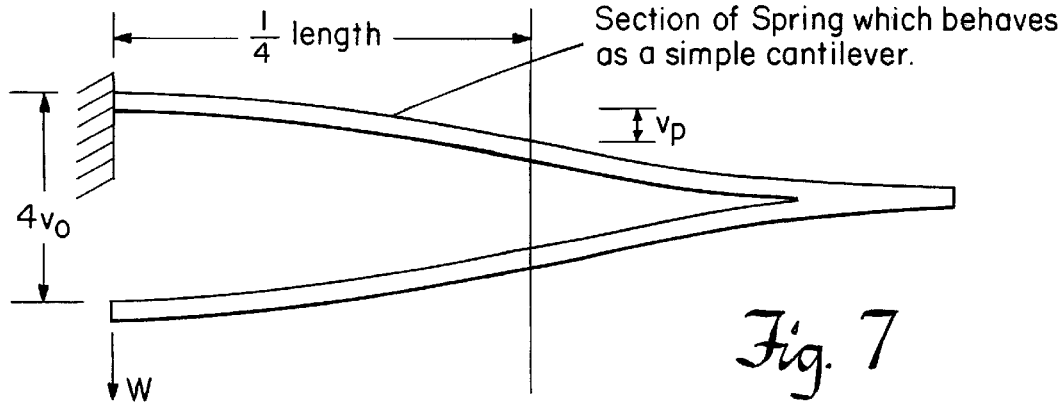
FIG. 7 is a side view of a spring under tension.

The springs are treated as four cantilevered beams as shown in FIG. 7. The deflection of a cantilever beam loaded at the end is defined as follows:

$$v_o = \frac{Wl^3}{3EI},$$

where
W is the applied load
l is the length of the cantilever,
E is the Young's modules, and
I is the moment of inertia.
For a rectangular beam the moment of inertia is defined as follows:

$$I = \frac{bh^3}{12},$$

where
h is the thickness and
b is the width $$v_o = \frac{4Wl^3E}{bh^3}$$

Each of the four equivalent sections behaves like a cantilever with the weight W being applied to its free end. The total deflection of the spring is $4v_0$ and the length used in the formula must be written as L/4 where L is the total length of the folded spring, so $$v_o = \frac{4Wl^3E}{bh^3}$$

$$4v_o = \frac{-16WL^3/4^3}{Ebh^3}$$

Rearranging the equation into the form W=−k*$4v_0$, gives the spring constant (k) with four springs supporting the mirror support mass as $$k = \frac{(4)bh^3E}{L^3},$$

Substituting in reasonable values such as:

b=2.0×10$^{-4}$ cm,
h=0.5×10$^{-4}$ cm,
L=30×10$^{-4}$ cm, and
E=2.07×10$^{12}$ dynes/cm$^2$
results in
k=7.66×10$^3$ dynes/cm.
Therefore the resonant frequency of each individual spectrometer will be $$\omega = (4k/m)^{1/2} \sim 8.91 \times 10^5 \text{ radians/second,}$$

so $$f = \omega/2\pi \sim 142 \text{ KHz.}$$

Figure 8:
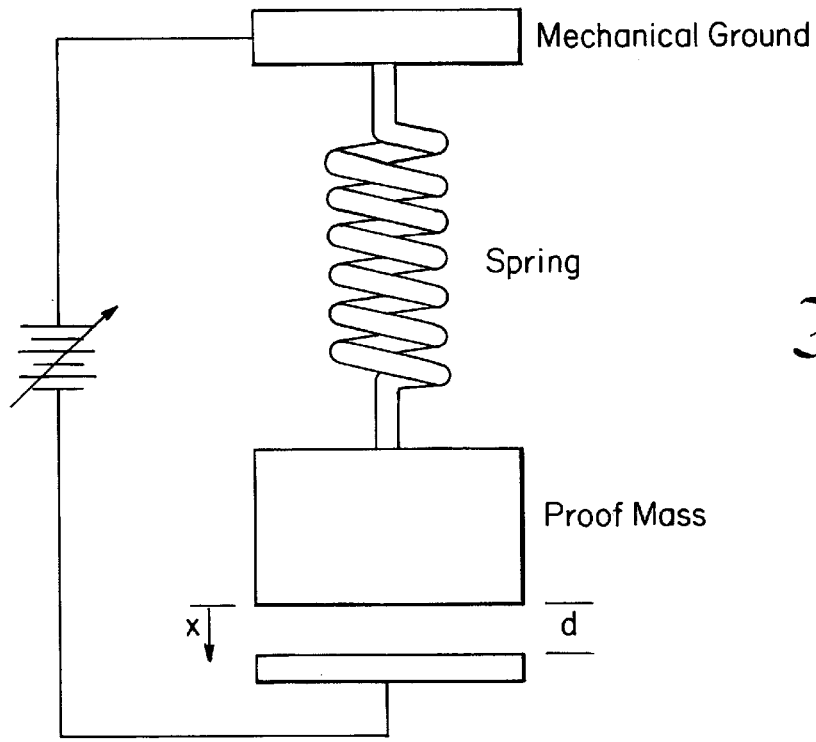
FIG. 8 is a schematic of the proof mass, spring and electrostatic force plates.
Figure 9:
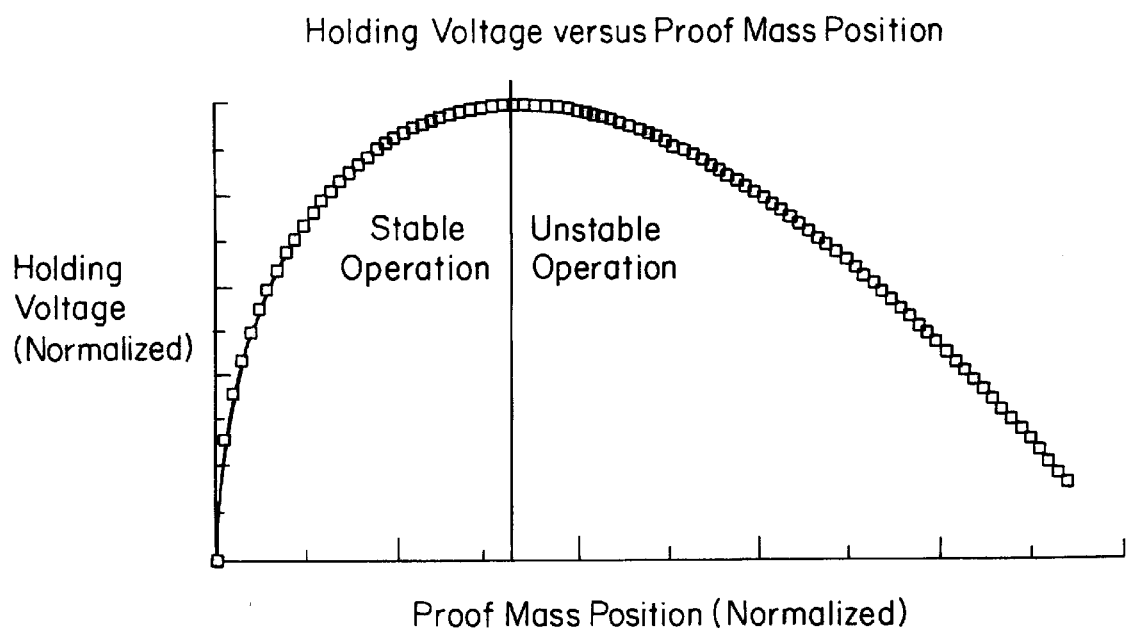
FIG. 9 is a plot of holding voltage versus the proof mass position.

The magnitude of the electrostatic force between two parallel plates of a capacitor ignoring fringing fields can be expressed as $$F = \varepsilon_o A \frac{(V^2)}{2d^2}$$

where
d is the spacing between the electrodes,
$\epsilon_0$ is the permitivity of free space,
A is the are of one of the plates, and
V is the applied voltage.
The permitivity of free space $\epsilon_0$ is expressed as 8.85×10$^{-7}$ dynes/volt$^2$. Using the configuration shown in FIG. 8, the force exerted by the electrostatic field is counteracted by the spring such that $$kx = \varepsilon_o A \frac{(V^2)}{2(d-x)^2}$$

where
x is the distance the mirror support has moved away from its equilibrium position.
This leads to the relationship between the voltage and the position $$V = (2kx/\varepsilon_o A)^{1/2} * (d-x),$$

which has been plotted in FIG. 9. For small x, the voltage required to hold the proof mass in position varies approximately as the square root of the distance. As the position increases, the voltage required to hold the proof mass increases monotonically but at a ever decreasing rate. At a point one third of the original distance, d, the slope (dV/dx) is zero. Further increases in the position require less holding voltage. Therefore, if the position were to increase beyond d/3, then at a fixed voltage, the bridge body would continue to be accelerated until the force plates of the capacitor met. Therefore, for voltages above the maximum value ($v_{th}$) indicated on the curve, the system would be unstable. To operate the unit safely, the voltage should be restricted to a value well below $V_{th}$. It can also be appropriate to incorporate stops in the mechanical design to prevent the electrostatic plates from collapsing together. As part of the design considerations, the initial spacing, d plays a crucial role in the performance of the device.

When using an AC electric field a broader range of static operation of the microspectrometer can be obtained. For example if the force on the bridge due to the applied AC voltage be:

$$F = \tfrac{1}{2}\epsilon A V^2/d^2 = \tfrac{1}{2}\epsilon A V^2_{AC}/d^2 \cdot \sin^2 \omega t$$

where $V_{AC}$=the magnitude of the applied AC voltage $\omega$=the frequency of the applied AC voltage.

To work properly, $\omega$ must be greater than the resonant frequency of the bridge and far from any other mechanical resonances of the bridge. The average force the is:

$$F_{AVG} = 1/T \int_0^T P(t) dt = 1/4\epsilon A V_{AC}^2/d^2$$

We can now capacitively couple;
As a result, the voltage on the bridge is now $$V_{bridge} = \frac{C_{fixed} * V_{AC}}{(C_{fixed} + C_{bridge})}$$

However, $C_{bridge}$ changes with the motion of the bridge.

$$C_{bridge} + \frac{\epsilon A}{d-X}$$

where d is the initial spacing

X is the displacement.

The voltage on the bridge is consequently given by the expression:

$$V_{bridge} = \frac{C_{fixed} * V_{AC}}{\left[ C_{fixed} + \frac{\epsilon A}{(d-X)} \right]}$$

and the average force is now, $$F_{average} = 1/4\delta A \frac{\left[ \dfrac{C_{fixed}^2 V_{AC}}{C_{fixed} + \dfrac{\epsilon A}{(d-X)}} \right]}{(d-X)^2}$$

$$F_{average} = 1/4\epsilon A^2 \left[ \frac{V_{AC}}{(d-X) + \dfrac{\epsilon A}{C_{fixed}}} \right].$$

This force does not increase indefinitely as X grows to d but instead reaches a maximum of $$F_{average} = \frac{1}{4\epsilon A} * [V_{AC} * C_{fixed}]^2.$$

Therefore, using a series capacitor allows one to control the position of the bridge in a static manner by eliminating the instability that is found when a DC voltage is used to deflect the bridge.

Another implementation addresses the order effects illustrated in FIGS. 3A and 3B. Order effects limit the dynamic range of a single device. However, the limitation can be removed by using an array of devices which have different center frequencies.

When used to measure composition, the microspectrometer is normally mounted behind an optically transparent window in order to protect it from dust and corrosive fluids. It is possible to integrate this packaging function into the device itself. The result is a more complex structure, with greater electronic support requirements. However, the integrally sealed structure has greater capability: it can characterize physical and certain electrical properties of the media in contact with the device in addition to the compositional measurements described above.

Figure 5A:
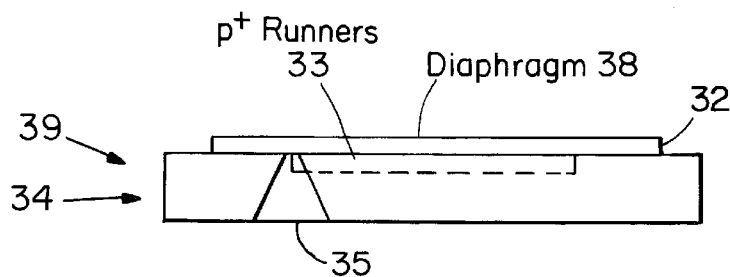
FIGS. 5A–5B are a sealed microspectrometer incorporating features of the present invention.

Optically, the sealed multisensor 34 is identical to the Fabry-Perot device described above. However, the moving bridge is replaced by a moving diaphragm 38 as shown in FIG. 5A. Planarity in the center section of the diaphragm can be maintained by a dual strike process, or by use of convolutions that stiffen the center relative to the peripheral region. Plating conditions must be carefully controlled in order to avoid excessive stress levels. Alternatively, similar materials such as a polysilicon diaphragm on a silicon substrate 39 can also be used. A dogleg 32 is included for relief of thermal expansion mismatch. Practical implementation often requires that the outermost layer resist environmental damage from the fluid (chemical attack, erosion, surface fouling and scaling) without compromising optical performance. Deposited films of diamond, silicon carbide and boron nitride are examples of such layers. In applications where chemical attack is a problem, for example, elimination of film defects is a primary objective. Thus, diamond-like films would often be preferred rather than single crystal diamond films which can be susceptible to substrate defects. Note that environmental compatibility is bidirectional, that is, the fluid must not degrade the device and the device must not degrade the surrounding material. This issue is a particular concern in biological applications where the exterior layers of the device must meet biocompatibility criteria.

The time varying gap thickness is normally determined by force plate excitation, and measured by the capacitive detector. The integrally sealed version has an additional characteristic: gap thickness is also affected by pressure forces from the medium. This DC offset in bridge position is readily measured by the detector, and corrected by adjusting the DC level in the force plate circuit. Thus, the force plate DC signal is a measure of fluid or barometric pressure. Thus the system can be employed for optical, mechanical and temperature measurements of the medium.

Also of importance is the ability to monitor fluid "noise" sources such as transient surface charges, density fluctuations and pressure pulses. These effects arise from turbulence, multiphase effects and characteristics of nearby equipment. In industrial processes, most process noise is low frequency (below 30 Hz). As a result, the noise attributable to pressure pulses can easily be separated from the higher frequency bridge excitation; it is essentially a low frequency signal superimposed on the DC position offset mentioned above. When the AC drive signal is set to zero it is possible to measure the force applied by the fluid to the diaphragm by applying a DC signal and measuring the AC signal induced by movement of the diaphragm.

Surface charge effects can also be monitored depending on the fluid and the degree of electrical grounding. In many flow applications, immobilized static charge layers form in the fluid at the solid-fluid interface. These charges, in turn, attract charges that are less tightly bound. Therefore, they form and decay in close correlation with the incidence of turbulent eddys and secondary phases. This surface charge effect is related to the phenomena termed "streaming potential" and might be expected to occur only in ionic liquids. However, similar effects have been observed in some non-conductive fluids. Formation and decay of electrical charges at the diaphragm surface modulates diaphragm voltage.

Thus, the sealed microspectrometer drive and position detector system described in greater detail below enables electrical surface charge effects in biological, and other fluids to be monitored either separately, or as part of a device which correlates them with optical properties.

The resonant frequency of an element, $f_n$, is a function of mass. Typically:

$$f_n \propto \frac{1}{\sqrt{m^*}}$$

where $m^*$ is the effective mass of the diaphragm plus the fluid in contact with it. This effect has been used in the past to make densitometers. The present invention extends this capability to smaller sizes. It also allows density fluctuations in multiphase fluids to be measured and correlated with transients in local optical properties.

In summary, the sealed microspectrometer enables simultaneous high rate characterization of the composition, physical and electrical properties of moving fluids. Potential applications include atmospheric studies, wind tunnel instrumentation and chemically reacting systems.

Figure 5B:
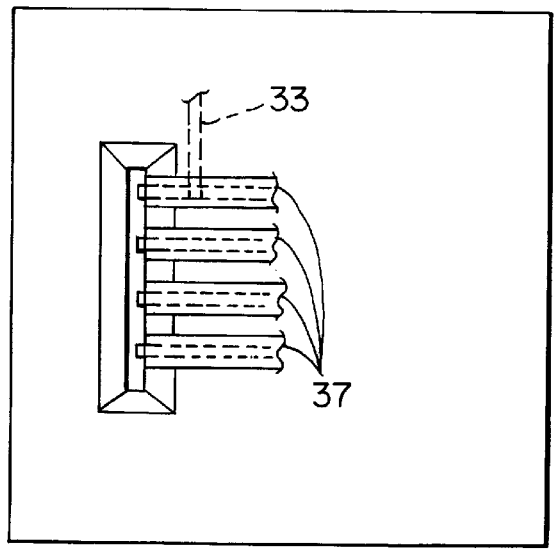

The major differences in fabrication between the sealed microspectrometer and the standard design involve the need for backside electrical contacts and for access to the sacrificial layer under the diaphragm. These requirements can be accommodated by implanting and driving p+ runners for each of the frontside structures in (100) silicon wafers. Late in the process, a "well" 35 is etched from the backside with the etch resistant p+ runners 33 being exposed as "diving boards" in the well 35. This is conveniently accomplished by using a standard piezoresistive pressure sensor process based on hot KOH. Lightly doped silicon and the aluminum sacrificial layer are rapidly etched in this process, leaving the p+ regions exposed at the bottom of the well. Shadow mask deposition of gold 37, as shown in the bottom view of FIG. 5B, brings these contacts out to the back surface of the wafer for probe testing and mounting. As shown in FIG. 5B, an additional p+ runner 33 extends to the diaphragm base on the frontside of the substrate 39. Similar runners can also be used for the force plate and emitter connections.

It should also be realized that other advantages are realized by placing a liquid in the gap. In such a case, the motion of the bridge would be significantly retarded by the liquid. This makes it possible to statically operate the device over gap ranges exceeding the one third limit previously mentioned. This can be implemented by pulsing the voltage applied to the force plates and monitoring the position. By varying the pulse width, duty cycle or height, the gap spacing could be maintained. Limitations on these techniques are established by considering the bandwidth of the mechanical system which consists of the bridge and substance within the gap, and the bandwidth of the electrical feedback circuit. Stability is achieved when the bandwidth of the electronics exceeds that of the mechanical system.

The liquid in the gap could be either high or low index material. The device will operate as described previously with a low index liquid. With a high index liquid, the mirrors are adapted in the following way. Whereas with the low index liquid a high-low-high three layer mirror is used, with a high index material, a low-high-low index material, a low-high-low index mirror is preferred. This provides a low index layer to the outside environment and has the benefit of reducing the reflectivity of the spectrometer to incident light, thereby providing higher sensitivity.

A microspectrometer is described herein which can be fabricated on silicon substrates using conventional silicon microelectronic fabrication techniques. A micromechanical bridge structure is used to support an optical interference mirror. The bridge, gap, and the underlying silicon detector form a complete interference filter. Initial modeling results demonstrate that when the gap between the bridge and silicon detector is varied, the center wavelength of the interference filter changes. The interference filter represents the wavelength selective component of the spectrometer and takes the place of a prism or grating in a conventional spectrometer.

An electrostatic drive sets the bridge into oscillation at its fundamental frequency. This causes the upper mirror to move periodically closer and farther from the photodiode creating a time varying gap spacing. The wavelength of the light selected for transmission to the photodiode is therefore also time varying and with the same frequency as the bridge. The output of the photodiode will be a periodic spectrum of the incident light.

Figure 10:
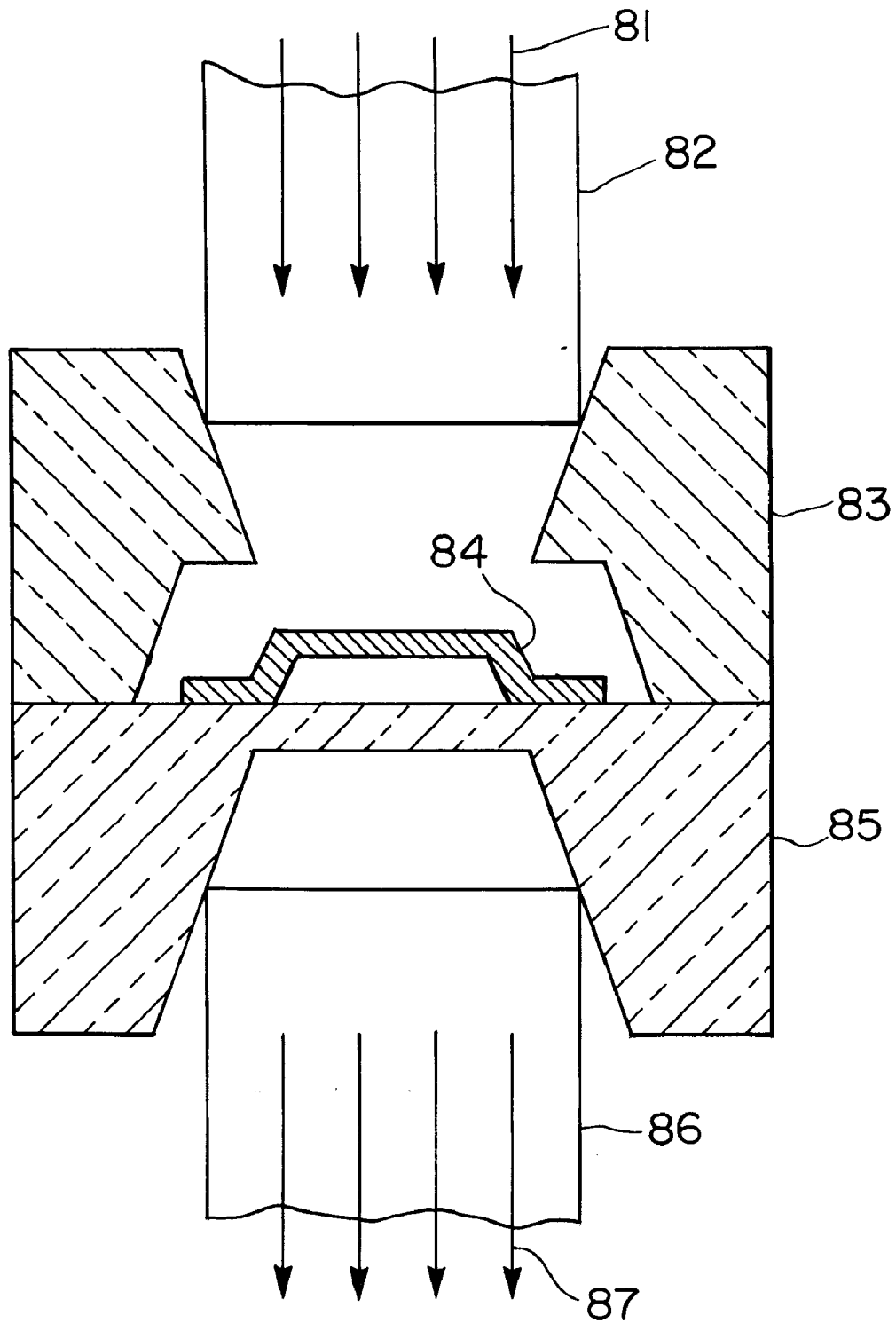
FIG. 10 discloses the use of fiber optics for both input and output of optical signals.

In some applications, it may be more suitable to separate the wavelength selective element from the light source or detector. FIG. 10 shows a possible implementation in which both the light source and detector are remote. As shown, the Fabre Perot interferometer is fabricated as described previously in a silicon substrate. The silicon substrate is later etched in an anisotropic etchant from the back side to create a groove or pit into which an optical fiber could be inserted. Alternatively, the groove could be created with any shape if etching techniques including isotropic chemical etching, dry etching, plasma etching and ultrasonic machining. A second bulk silicon micromachined etchant has been bonded to the surface of initial silicon substrate. This part is added specifically for the purpose of aligning a second optical fiber to the Fabre Perot interferometer. Light from a remote source can now be coupled into the wavelength selective element, the output of which is transmitted to a remote detector. The benefits of this approach include the ability to monitor hostile environments by separating the micromachining device from the source. Additionally, it may be advantageous to cool the detector. Separation of the detector and the wavelength selective element would allow cooling of the detector without detriment to the micromechanical device. This could be especially important if control electronics are included on the same chip with the micromechanical device.

In FIG. 10, both an input fiber 82 for incident light 81 and an output fiber 86 to couple the received light 87 to the detector are shown. It should be understood that in specific applications, the input, output or both fibers could be eliminated. Fabrication of the Fabre Perot interferometer with components bridge 84 and substrate 85 are fabricated as a separate element. This device could then be used in conjunction with a separate detector element. For instance, in infrared applications, a lead sulfide (PbS) detector may be appropriate. This detector could be fabricated in a piece of glass as is usual, and brought into close proximity to the Fabre Perot interferometer. In this way, the processing associated with the detected manufacturing would be separate and apart from the fabrication of the interferometer. The sealed microspectrometer can be used as a single element to detect and quantify the occurrence and frequency of optical, density, pressure and electric disturbances which occur in a fluid near the solid-fluid interface. Back etching of the silicon substrate 85 can be used to center the output fiber 86 or fiber bundle and mounting element 83 is used to center the input fiber 82 relative to the cavity. Element 83 can be mounted or integrally fabricated onto the substrate 84.

Figure 11:
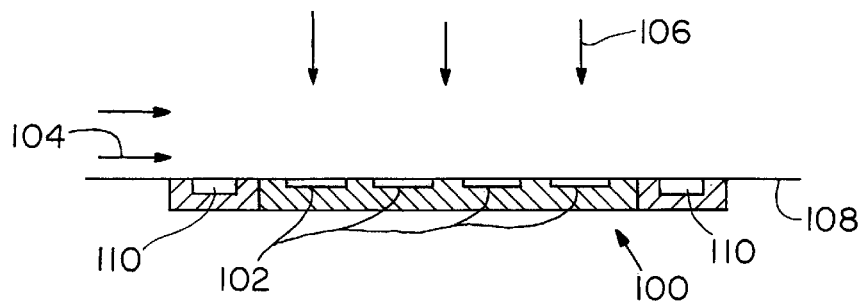
FIG. 11 is a schematic cross-sectional illustration of the use of the invention in measuring the properties of a fluid.

FIG. 11 is a schematic cross section showing an array 100 of sealed microspectrometer sensing elements 102 which are positioned to receive incident light 106 which is passing through fluid 104. Light 106 can be generated by a broad or narrow band light source which can be directed to the array by fiber optics or can be ambient light. The array 100 can be mounted in the wall 108 of a pipe or some other interface with a fluid. The fluid can be stationary or moving relative to the array. Implementation as an array provides information on the size or scale of the disturbances noted above. The array format also allows the user to actively interact with the interfacial fluid. For example, a transient voltage pulse in one or more diaphragms will alter the electric field and generate an acoustic signal in the adjacent fluid 104. Response to these artificial disturbances would be detected by other elements in the array. Additionally, one or more of the positions in the array could be occupied by light emitters 110. Emitted light would be scattered by inhomogeneities in the fluid, detected by the nearby sensing elements, and interpreted in terms of phase, angle, intensity and spectral distribution.

The light emitters 100 could be monolithically incorporated on the substrate. These could, for instance, include Light Emitting Diodes (LEDs), Lasers, or broadband sources such as hot filaments. In the case of narrow band or line emitters, such as LEDs and surface emitting lasers, these are typically fabricated in III-V materials such as GaAs, GaInP, InP, GaAlAs, etc. Techniques for transferring these materials and devices onto silicon by deposition or thin film transfer are well known. Laser light sources would be particularly advantageous if used in conjunction with fluorescence and Raman scattering measurements. Broadband emission from thermal filaments can be used for reflectivity measurements. An optical signal can thus be produced in the chip and directed onto the sample under study. Fiber optics can be used to couple the source, sample and sensor.

Figure 12:
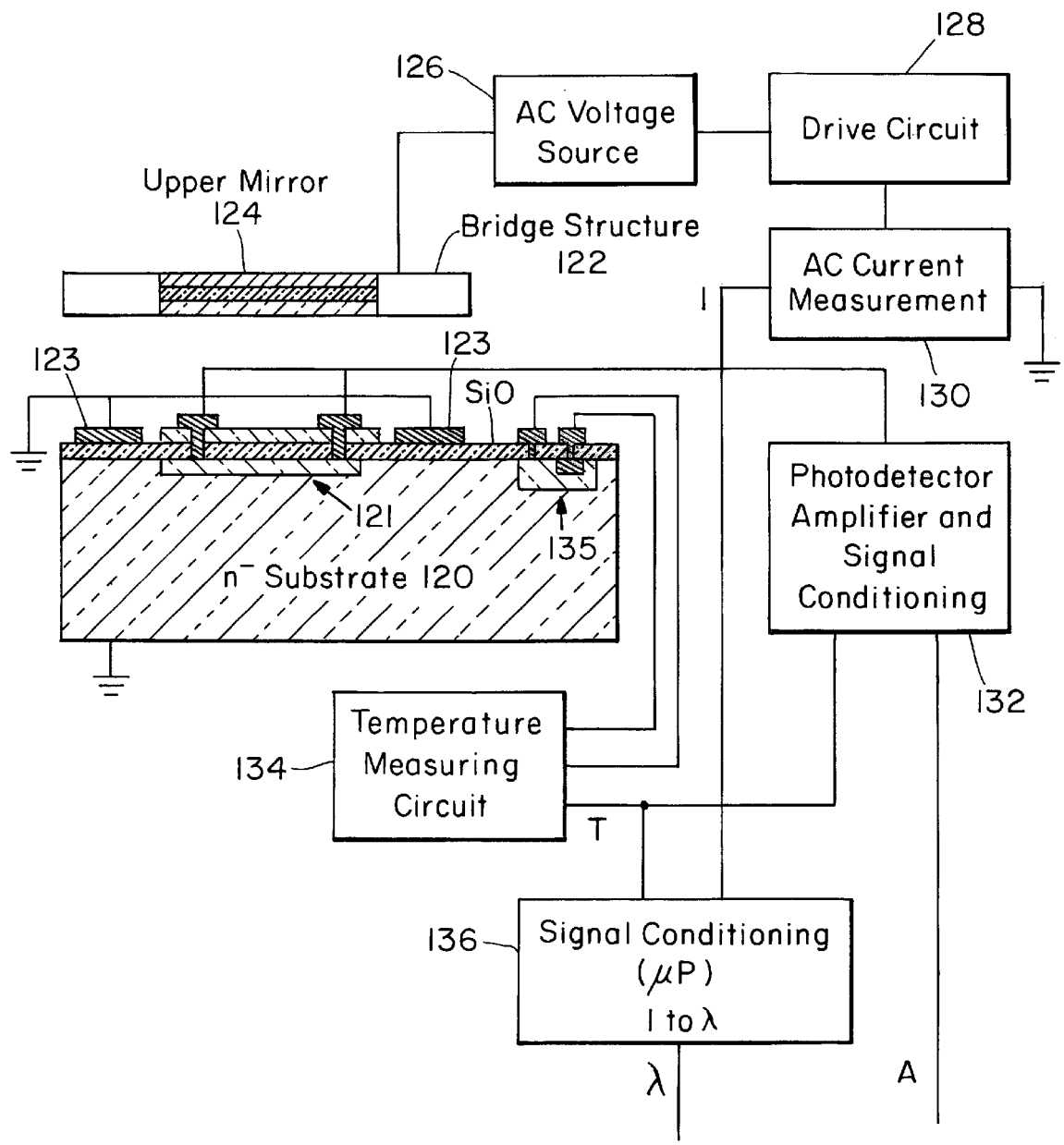
FIG. 12 schematically illustrates a circuit for a microspectrometer employing separate spacing and signal measuring systems.

FIG. 12 schematically illustrates a single spectrometer that is shown with a temperature compensating circuit. A drive voltage is generated in the drive circuit 128. Its output is converted through an AC Voltage source 126 to the bridge 122 and is used to control the position of the bridge 122 and upper mirror 124. The capacitance between the bridge and the drive counter electrodes (123) on the substrate 120 is monitored by applying a small ac-signal. This signal is provided by the AC Voltage source 126. The AC current is measured in the AC current measurement circuit 130. This current is directly proportional to the gap spacing. Through the signal conditioning circuit 136 the AC-current is converted to a voltage which is proportional to the wavelength ($\lambda$) of light being measured by the photodiode formed from the photodiode emitter 121 and the substrate 120. A temperature compensation circuit 134 which can typically employ a silicon transistor 135 is used to compensate both the position measurement and the output of the photodiode and its amplifier. The photodiode amplifier and signal conditioning 132 produces an output (A) that is directly proportional to the incident light energy in the photodiode. A data processor and memory can be employed in any of the following embodiments to control operation of the spectrometer or array and record spectra, images or other data being collected.

Figure 13:
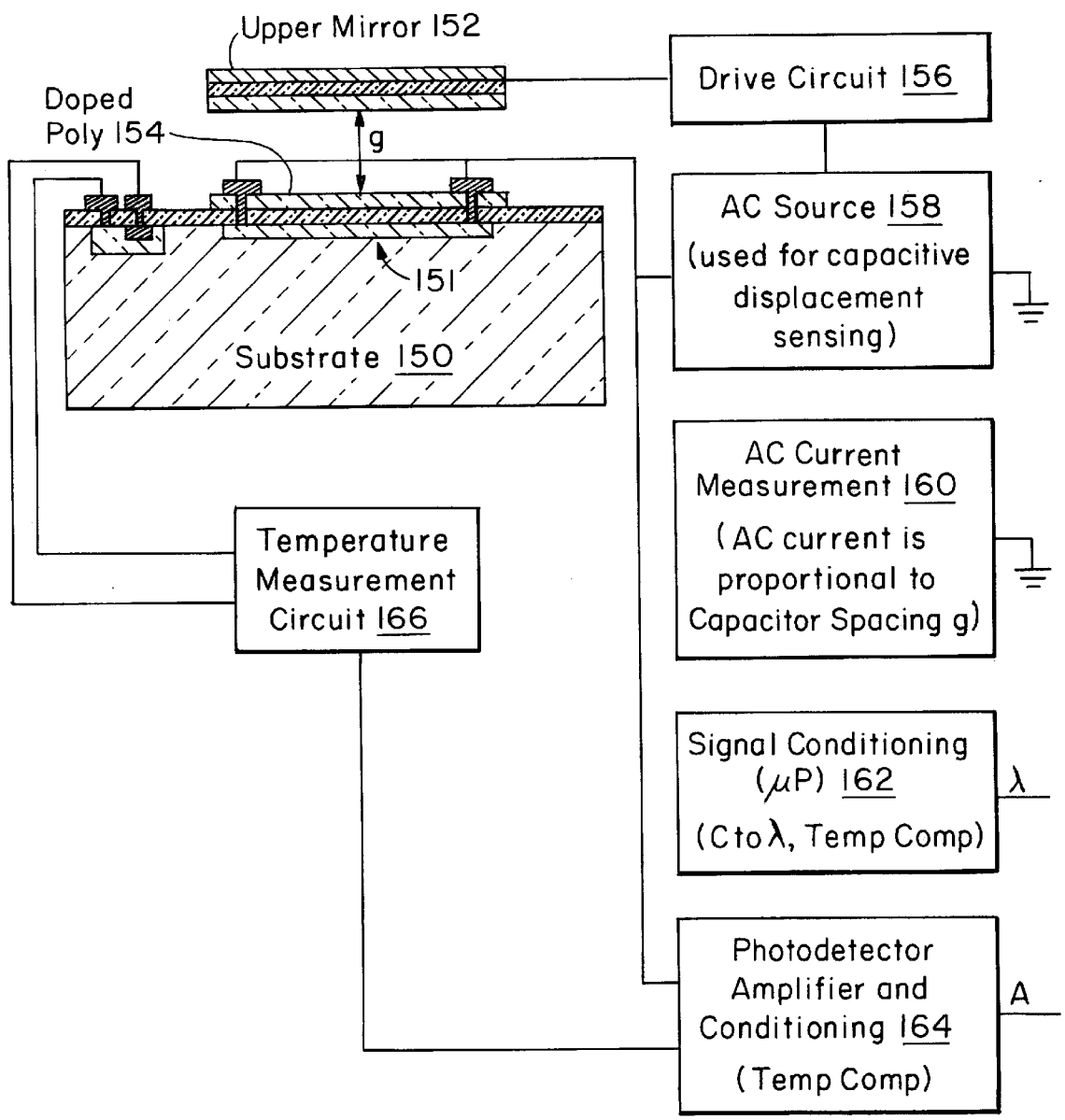
FIG. 13 schematically illustrates a circuit for a microspectrometer employing a single capacitor system to drive the bridge and monitor the bridge gap.

FIG. 13 schematically illustrates a circuit and device similar to the one just described except that the bridge capacitance and force plates have been combined In this single capacitor system the force plate can be used to move the bridge and measure the gap. In this case, capacitance of the upper mirror 152 relative to the silicon photo diode 151 is monitored. In order to achieve this goal, the mirror must be at least partially conductive. The electrostatic drive voltage is applied by the drive circuit 156 between the partially conducting mirror 152 and the surface of the photodiode 151. This causes the gap to change as described previously. Again a small AC signal is superimposed in the drive voltage by AC source 158 to provide capacitive displacement sensing. In a typical application, its frequency would be much greater than that of the drive voltage. The AC current measurement circuit 160, signal conditioning circuit 162, temperature measurement circuit 166 and the photodetector amplifier and conditioning circuit function as described previously.

Figure 14:
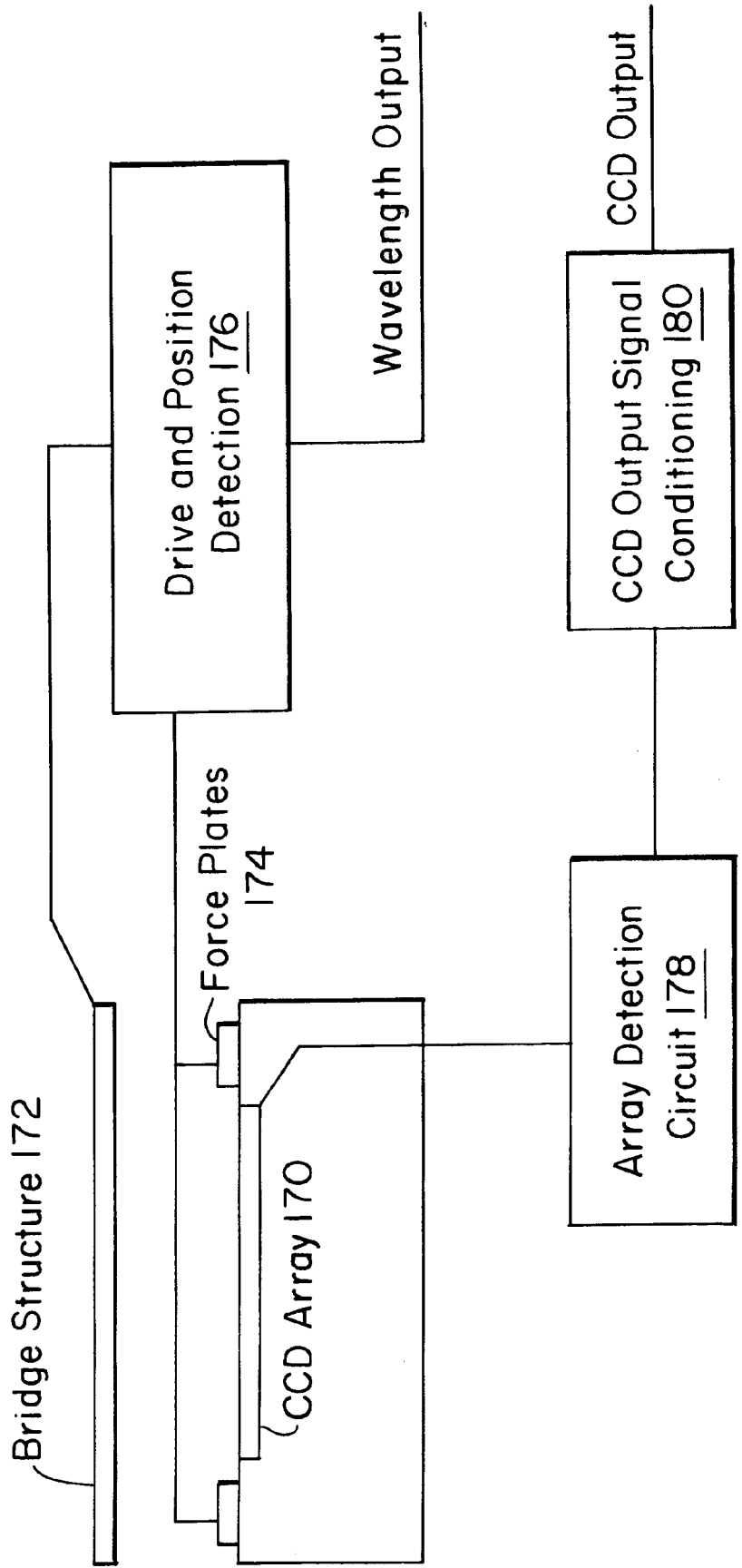
FIG. 14 schematically illustrates a circuit employing a single bridge and a charge coupled device for the detector.

In FIG. 14 a CCD array 170 has replaced the usual single photodiode beneath the bridge 172. The output of the CCD array 170 is monitored using an array detector circuit 178. This circuit may, for instance, scan the array and produce composite video output. The signal may be further conditioned at 180 to compensate for temperature effects and to linearize the output as a function of wavelength. The drive and position detection circuit 176 is similar to that described in the previous two figures.

Figure 15:
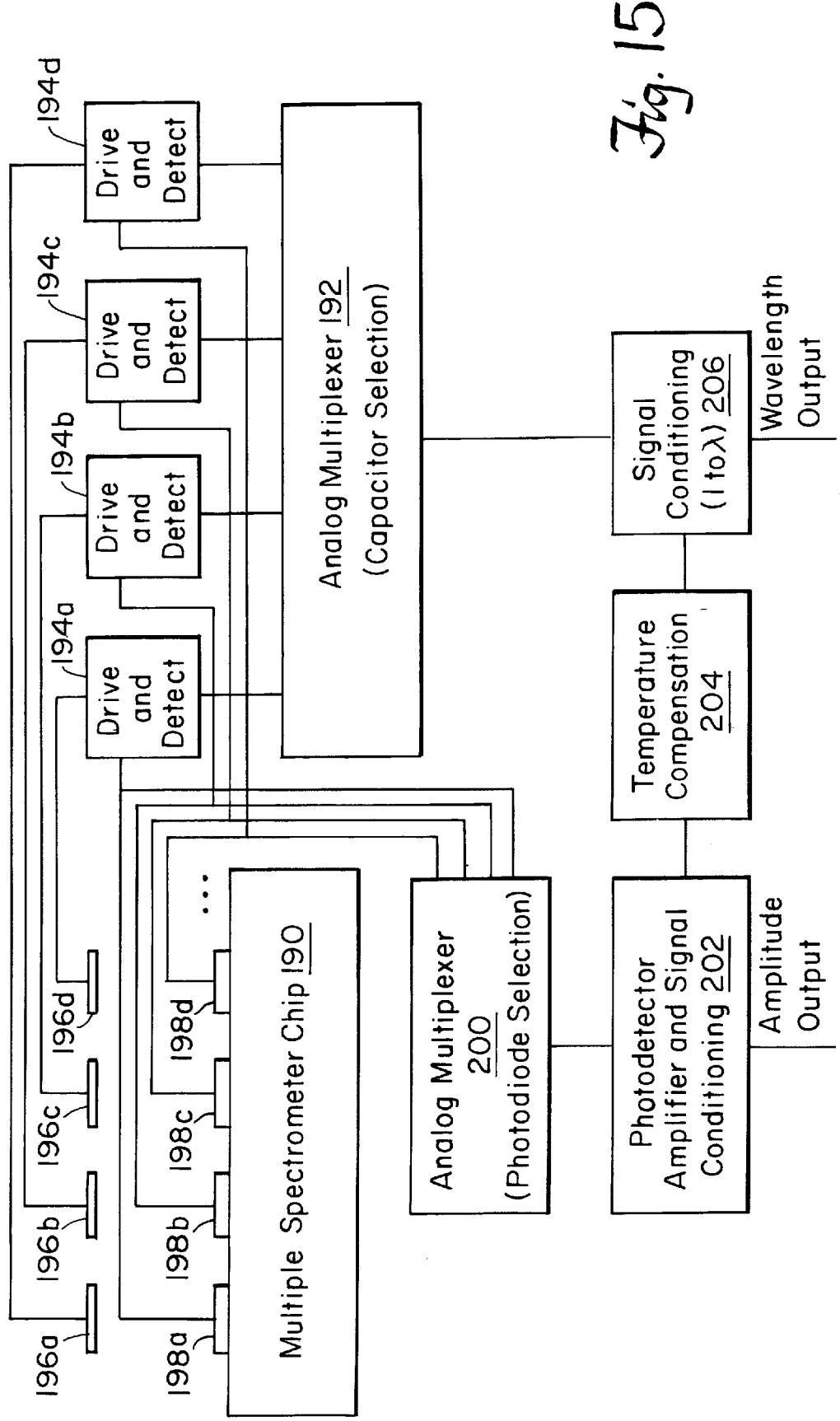
FIG. 15 is a schematic circuit diagram of a microspectrometer system in accordance with the invention.

FIG. 15 illustrates an implementation of the basic concept in which an array of individual scanning elements 196a–d has been assembled. Each element has its own drive and detector circuit 194a–d. The output from these circuits is the input to an analog multiplexer 192. A second analog multiplexer 200 selects the corresponding photodetector signal from detectors 198a–d formed on chip 190. Both the position signal and photodetector signal are sent to signal conditioning circuitry 206 and 202 which is meant to compensate for non-linearities in the output of the photodiodes with wavelength, temperature and other non-linearities. Temperature compensation is provided by circuit 204 as previously described. Information about which detector has been selected may be output by the multiplexer circuitry if it is selected by on-chip electronics or may be input on an external processor.

Finally, hybrid packaging techniques could be used to assemble various elements discussed above. For instance, one employs a package which incorporated a silicon chip with drive and sense circuitry, a separate chip containing the interferometer and a last chip containing the detector.

When built as a sealed multisensor, the microspectrometer offers simultaneous measurement of fluid composition, pressure, mass loading transients and microscale turbulent properties of fluids.

A microspectrometer as described above will be extremely useful in many industrial applications. Optical spectrometers are currently used to determine the constituents of stack gases, for hazardous gas monitors in at-risk ambient air sites, for other chemical analysis, for flame analysis, in instruments used to determine film thickness, in both in vitro and in vivo measurements of biological fluids or tissue and in many other applications. Existing spectrometers are large and expensive, limiting their use. The disclosed microspectrometer provides a means to perform optical analysis at very low cost and in very small spaces that are otherwise difficult to access and accurately analyze.

A preferred embodiment of the invention involves gas sensing which can be accomplished by several methods including spectral analysis. In this embodiment, a microgas sensor is provided in which the sample gasses are stimulated to emit photons at characteristic frequencies. These photons enter the spectrometer which produces an output proportional to the spectral intensity of the incoming light. Complete spectra can be obtained in fractions of a millisecond. These spectra are compared with known spectral characteristics to determine the constituent gasses.

Existing instrumentation for gas spectral analysis tends to be large and complex. The miniaturized microspectrometer offers significant advantages over existing instruments including smaller size and weight, lower cost of fabrication, faster data acquisition and improved reliability. The optical properties of an unknown material can reveal important information leading to a determination of its composition or physical properties. For instance, many have used spectral analysis of optical emission lines to determine the atomic species of gaseous materials for many years. Optical spectra are also used routinely by the semiconductor industry to determine the thicknesses of multilayer thin films.

This embodiment is based on the analysis of the unique spectra of optical energy emitted by excited gases. At room temperature, the atoms that comprise gasses are typically found with their electrons occupying all the lowest energy states. By providing energy to the electrons, they can be excited into higher energy states. Once excited, electrons will decay to the ground states emitting photons at characteristic wavelengths. Each species has its own characteristic spectra that can be used to distinguish it from other gas species.

Gas analyzers are designed to isolate specific gas species and to quantify their abundance. The present system involves the construction and integration of a miniature pump, optical spectrometer and gas excitation chamber. The small volume pump continuously moves samples of gas into an excitation chamber where it is ionized using a high potential corona discharge. Radiation emitted from the ionized gas is directed toward a miniature optical spectrometer. The spectrometer, as described previously herein will decompose the light into its individual spectral components. This spectra is analyzed using signal processing algorithms. Integration of the signal processing with the micromechanical components is also provided.

The complete device fits on a silicon chip no larger than a square centimeter. The pump gas excitation chamber can be fabricated using bulk micromachining techniques. The spectrometer is a surface micromachined device that, in this embodiment, is placed directly above the ionization chamber.

The sensitivity of the system does not rely on the selectivity of a particular material, but rather on the emissive properties of the gas under examination. This allows the construction of a single instrument which can be adapted for a specific application. This is accomplished by an analysis of the spectral output of the proposed device. Yet at the same time, this instrument is fabricated using the batch fabrication techniques characteristic of solid state sensors. In addition, the device is capable of responding in as little a one millisecond depending on the relative intensity of the signal to be discriminated.

In the present device, grooves are formed in the silicon to channel the gasses from the sample source into the excitation center. Channels in silicon are created using a number of etchants. Some etchants are selective to specific silicon planes. Most anisotropic silicon etches etch the (111) plane much more slowly than any other crystalline plane. After etching in an isotropic etchant, some of all of the surfaces exposed are (111) planes. This feature of anisotropic etching can be used to create well defined mechanical structures.

A second method for creating micromechanical structures is to fabricate them on the surface of the wafer using deposited materials. In the present device, the spectrometer is fabricated using surface micromachining techniques.

Figure 16:
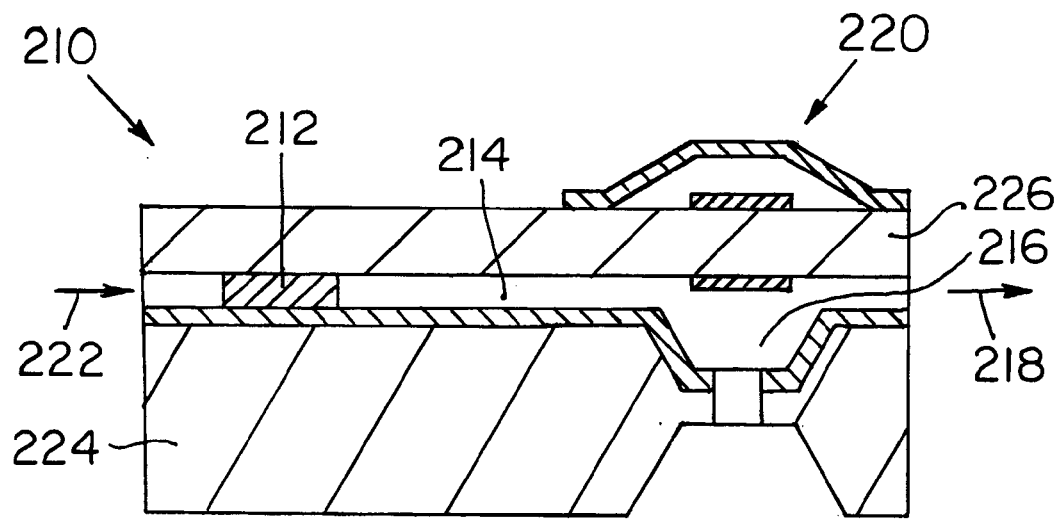
FIG. 16 is a cross sectional view of a gas analyzer in accordance with the invention.

The present embodiment of a microgas analyzer 210 contains three key components (FIG. 16), a pump 212, an excitation chamber 216 and a microspectrometer 220. The pump and chamber are fabricated in a silicon wafer 224 using bulk micromachining techniques. The microspectrometer is fabricated using surface machining on a second transparent substrate 226 such as a Pyrex wafer. The Pyrex wafer is subsequently bonded to the silicon wafer 224 using electrostatic or adhesive bonding such that the spectrometer is place above the excitation chamber as shown FIG. 16.

The present gas sensor can employ electrostatic pumps, and more particularly, a peristaltic pump. One pump 212 consists of a compliant diaphragm formed over a smoothly etched channel 214. Electrodes in the channel 214 and on the diaphragm can be excited consecutively to cause the pump to push gas down the channel. Gas enters the excitation chamber through inlet 222 where it is excited using an alternating electric field. The corona created by this technique can be maintained at one atmosphere and is sufficiently energetic to excite the gas to emit at its characteristic frequencies.

The gas is excited using a technique similar to the used to create ozone by a silent discharge in airfed ozonisers. The present ionizer consists of metal electrodes of very large area (for example 5 cm×1 cm) with 2 mm separation between them. The lower electrode is covered with silicon dioxide (dielectric constant=3.8) 1 mm thick. The ions are formed by electron impact disassociation. The electrons are created by supplying alternating high voltage at the electrodes which helps ionizing the gas. The value of the desired breakdown voltage for air is given by the Paschen relation as follows:

$$V_3 = 30d + 1.35 \text{ Kvolts}$$

In our case d=0.1 cm which gives the value of $V_3$ as 4.35 KV. When this voltage is applied numerous low current discharges are produced which are distributed homogeneously over the electrodes and discharge small areas of the dielectric. These electric discharges act on the atoms and molecules in the gas and ionizes them.

The values of dielectric and air capacitors for this particular example are calculated as 16.82 pF and 4.42 pF respectively. Assuming that a voltage source with peak voltage 6 KV and frequent 10 Khz, the power provided to the corona is approximately 2 Watts. The efficiency of the ionizer is determined by the amount of the power used by the electrons to create ions. In a ozonizer similar to the present system the efficiency was about 95%. That means only 5% of the power is being given to the ions and is eventually dissipated as heat. In our case the dissipated power is 20 mW/cm$^2$ which is well within parameters of chip fabrication.

The microspectrometer is a simple structure consisting of a lower mirror, a variable gap and an upper mirror and detector as described previously. The upper and lower mirrors consist of a series of high and low index materials. The thickness of each layer is set to one quarter of the center frequency for the spectral range to be analyzed. The gap is set to one half the center frequency. The upper mirror is supported on a micromechanical bridge that is fabricated on the Pyrex using surface micromachining techniques. In addition to supporting the upper mirror, a photoconductive detector is also deposited on the bridge and an actuator moves the upper mirror and detector closer and farther from the lower mirror, the wavelength transmitted through to the detector varies from short wavelengths to high wavelengths. Light which is emitted by the excited gas passes through the Pyrex and into the lower mirror of the spectrometer. Selected wavelengths are examined as the bridge moves from its lower position to its high position. The electrical resistance of the photoconductor is monitored and varies in accordance with the spectrum of the gas sample.

Since the wavelength range of the spectrometer is limited, it may be desirable to have more than one device in each analyzer. Two or more spectrometers forming an array can each scan different spectral ranges.

Conventional spectrometers use prisms or gratings as the wavelength selective element. In this system, the wavelength selective element is essentially a Fabry-Perot interference filter with one important difference. The center layer of the interference filter is an air gap that is created by fabricating a micromechanical bridge above the lower mirror. The two mirrors that are components of the interference filter are deposited both in a hole on the bridge and directly on the surface of the substrate. The bridge can be moved by any number of techniques including electrostatics as proposed here, or through thermal and piezoelectric effects. The preferred configuration is one in which the bridge was caused to oscillate at its fundamental frequency.

A further embodiment is a device providing a monolithic sensing system. It is mounted in a two port device header similar to those used for differential silicon pressure sensors. The input port on the header can include a small filter to prevent dust from entering the analyzer.

An ordinary optical flat of ¼ wavelength is not sufficient for precise applications. For high precision measurements, an optical flat of $1/20$ to $1/100$ wavelength is required. The most significant advantage of the Fabry-Perot interferometer relative to prism and grating spectrometers is that the resolving power can exceed 1 million or between 10 and 100 times that of a prism or grating.

Figure 17:
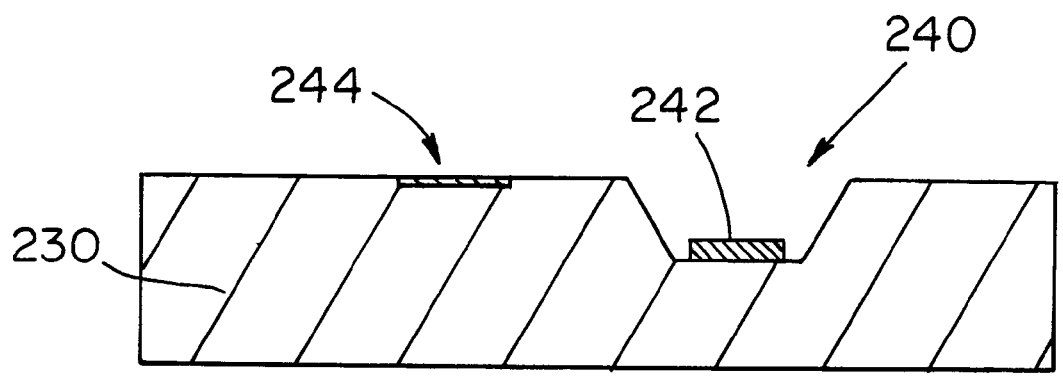
FIG. 17 is a cross-sectional view of a photodetector and integrated detector circuitry for a gas analyzer.

A completely integrated device includes a photodetector. Thus another embodiment includes an additional silicon wafer 230 with a photodetector and intelligent circuit added to monitor and analyze the resulting data. The additional detector and circuit is shown in FIG. 17 and is fabricated by forming a cavity 240 and forming a detector 242 within the cavity 240. Additional circuitry 244 can be fabricated in the wafer, and can be connected directly to other components of the spectrometer and/or off the device to monitoring or control circuits. This detector wafer 230 can include a linear or planar detector array that can be aligned with an array of spectrometers and gas chambers. An example of the integrated device is described below in connection with FIG. 20.

Figure 18:
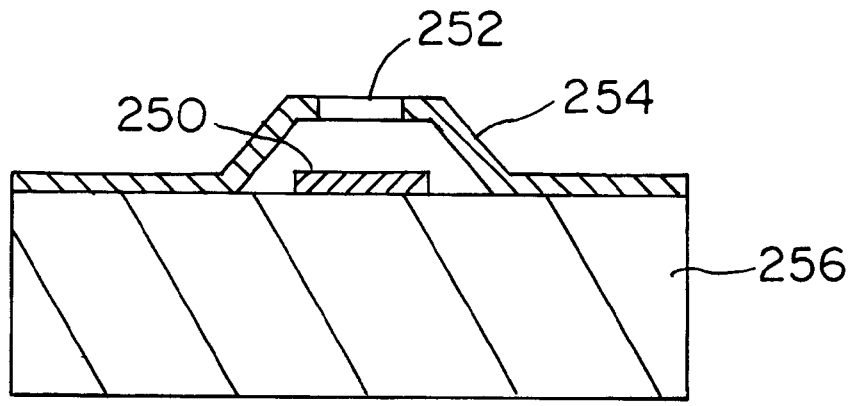
FIG. 18 is a schematic cross-sectional view illustrating a micromachined spectrometer on a transparent substrate.

In the schematic diagram shown in FIG. 18, a lower interference mirror 250 which includes a quarter wave Si layer, a quarter wave $SiO_2$ layer and a quarter wave silicon layer is placed on the Pyrex substrate 256. An air gap width of half the center wavelength in formed. Above the gap, a second interference mirror 252 supported by bridge structure 254 consisting of quarter wave silicon and silicon oxide layers is formed. The choice of silicon and silicon oxide is for convenience but other materials as described herein can also be used. Other material pairs can also be used, where one film has high index of refraction, such as silicon, and the other a low index material, such as silicon dioxide. In conventional interference filter designs, the center layer would also be low index material. In this filter, that material is air which effectively has an index of 1.0.

The reflectivity for a seven layer mirror centered at 0.5 μm will have a reflectivity of approximately 99%. Use of earlier the formula results in an estimate of the resolving power, RP=310. By definition, RP=λ/dλ and a predicted resolution at 0.5 μm is 16 nm. A typical layered interference mirror has a reflection exceeding 0.999 and in this application would provide a resolving power in excess of 3000.

A process for forming the ionization chamber and to monolithically fabricate the channels leading to and from the chamber is shown in FIGS. 19A–19E.

Figure 19A:
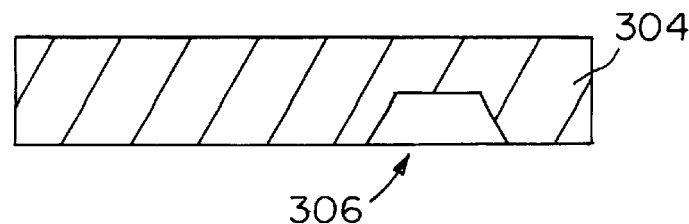
FIGS. 19A–19E illustrate a process flow sequence for fabricating the gas chamber and integrated fluid pump in accordance with the invention.
Figure 19B:
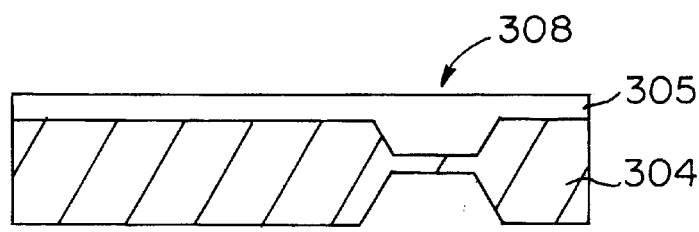
Figure 19C:
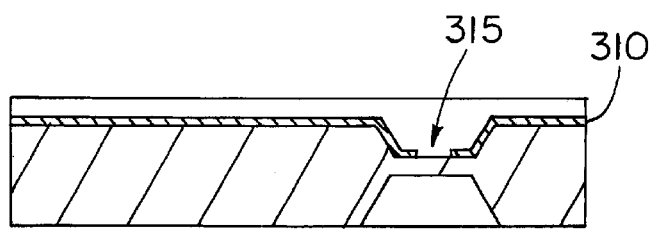
Figure 19D:
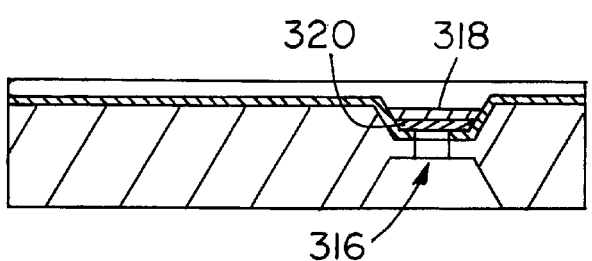

In FIG. 19A, a reaction chamber is formed in a silicon substrate 304 using the following process. Alignment marks are etched on both sides of the wafer 304, and a back etch is performed to create contact via 306 for the excitation electrode. Using the alignment marks on the side of the wafer opposite the contact via 306, a reaction chamber 308 and a flow tube or channel 305 running along the surface of the wafer 304 are formed using an anisotropic etch as shown in FIG. 19B. The wafer is oxidized 310 and a hole 315 is cut through oxide 310 to permit removal of the silicon through the hole 315 as shown in FIG. 19C. This results in a hole 316 through the silicon which is used to contact the electrode 318 that is formed in the excitation chamber (FIG. 19D).

A critical step in chamber fabrication is the creation of an electrically insulating layer that can be about 1 mm thick in a preferred embodiment that is used to isolate one of the electrodes. To accomplish this, a glass slip 318 is coated with an appropriate metal layer 320 (Cr/Au) and bonded to the bottom of the ionization chamber 308 using a eutectic bonding technique. Electrical access to the lower electrode is accomplished through the aligned and etched holes 315, 316 created on the backside of the silicon wafer.

As described previously, the aligned etched feature on the back of the wafer that permits electrical contact to the lower excitation electrode which is accomplished by direct wire bonding to layer 320 or back interconnect extending to a bonding pad on the back of the wafer. To accomplish this, double sided masking is required. To simplify the process, the gas injection channel depth and the ionization chamber depth can be equal in a preferred procedure, but aren't necessarily equal. If they are equal, both can be created simultaneously. Corner compensation features can be used to maintain the integrity of the edges of the deep etch features.

In order to attach the lower electrode to the silicon substrate, and at the same time maintain isolation from the chamber gasses, eutectic bonding can be employed. This technique involves the deposition of a low temperature alloy, Au/Ge for instance, to the lower surface of the ionization chamber. The chamber in the present example is initially about 2 mm in depth. Even with such a large etch feature, photoresist patterning can be employed. After patterning, a Cr/Au coated 1 mm glass electrode is placed Cr/Au surface down into the pit. The silicon wafer is subsequently heated to affect a bond between the Au surface and the eutectic layer. Electrical connection to the electrode can be established by wire bonding directly to the exposed side.

Figure 19E:
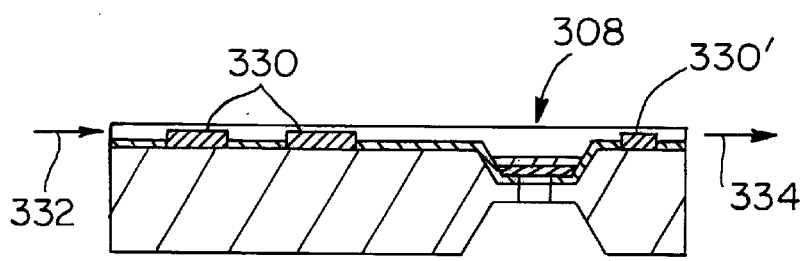

In the creation of the ionization chamber, the glass electrode bonding uses glass pieces that are patterned with metal and therefore are preferred to be in wafer form. After patterning they can be cut to size. They are capable of surviving the bonding temperatures (500 C) without softening. It is preferable if the glass has a thermal coefficient of expansion that matched silicon. An electrostatic pump is fabricated to provide fluid flow into 332 and out of 334 the chamber 308 through channel 305 as shown in FIG. 19E. The micropump can include two identical microvalves joined to opposite sides of a micromechanical membrane by microchannels. The microvalve dimensions can vary from 10 μm–100 μm in length, for example. The channels can be formed in several arrangements to direct the flow to and from the chamber. The electrodes used to drive the membrane or walls of the microchannel can be coated with silicon nitride or other material that is compatible with the fluid to be analyzed. In this embodiment, two membranes 330 are formed to provide paristalitic action on the input side of chamber 307 and a third membrane 330 is formed on the output side.

The surface micro-machining process includes photolithography steps and chemical vapor deposition steps. To begin, a first PSG layer is deposited and etched to form the channel 305 or channels. Polysilicon is etched to define the lower electrodes of the valves and pumping membranes. This is followed by the deposition of another encapsulating layer of silicon nitride. A plasma etch is then used to cut through both nitride layers exposing the ends of the channel. The second sacrificial layer of PSG is then deposited and etched to define the valve and membrane spacer areas. A silicon nitride layer and a polysilicon layer are subsequently deposited. The polysilicon is patterned and etched to define the upper electrodes. A final layer of silicon nitride is deposited and patterned to open the sacrificial PSG and contact areas. Finally, the PSG is laterally etched in an acid solution to open the channels.

Figure 20:
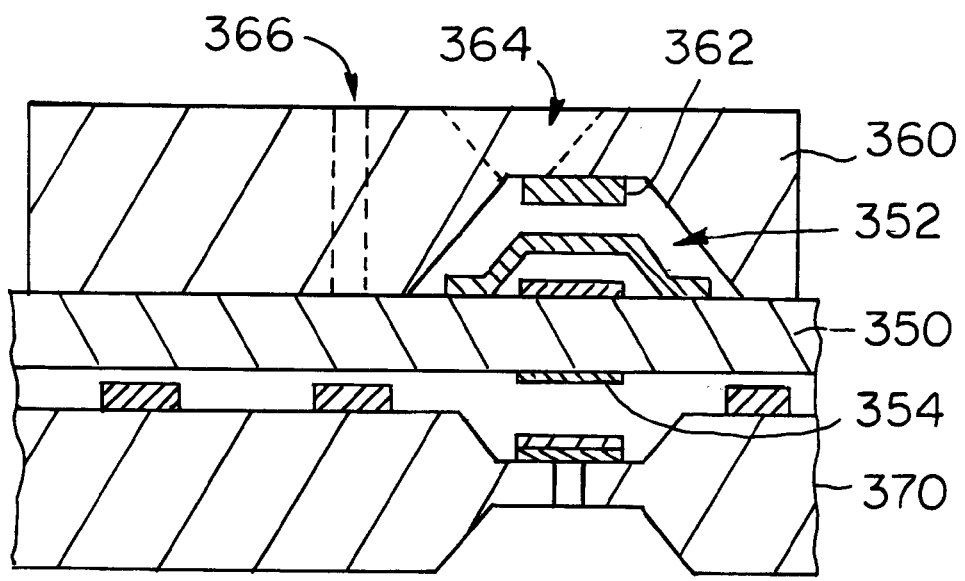
FIG. 20 is a cross-sectional view of assembled gas analyzer having three bonded wafers.

As shown in FIG. 20 the three wafers are bonded together to form the gas analyzer device. Wafer 350 is an optically transparent material such as a Pyrex plate which contains a counter electrode 354 and the spectrometer 352. It is bonded to the silicon wafer 370 after the channel and ionization chamber have been formed. The electrode on the plate 350 is aligned to the silicon wafer 370 prior to bonding. This is accomplished in a conventional aligner. Wafer bonding requires careful surface preparation and can be conducted at high temperatures (450 C) and high voltages (800V). Wafer 360 having the photodetector 362 is also bonded to plate 350. Contacts to the detector can be made through the back of wafer 360 through via 364 or interconnect hole 366. Electrical connections to the spectrometer and photodetector can include bonding pads and patterned metalization lines formed on the glass wafer 350.

Equivalents

Those skilled in the art will know, or be able to ascertain using no more than routine experimentation, many equivalents to the specific embodiment of the invention described herein. These and all other equivalents are intended to be encompassed by the following claims.

I claim:

1. A process for fabricating a microspectrometer in a silicon substrate comprising the steps of:

forming a detector with the silicon substrate;

forming a lower mirror over the silicon substrate;

forming a sacrificial layer over the lower mirror;

depositing a bridge structure over the sacrificial layer and the lower mirror, the bridge structure including a diaphragm supported relative to the silicon substrate with a plurality of springs and an upper mirror positioned over the lower mirror, the upper mirror having a plurality of silicon layers separated by a second layer having a lower index of refraction than the silicon layers;

selectively removing at least a portion of the sacrificial layer from underneath the bridge structure such that a gap is provided between a lower surface of the bridge and the lower mirror, the upper mirror of the bridge structure being optically transmissive to incident radiation over a given spectral range such that the detector generates an electrical signal correlated with the intensity of radiation incident upon the detector within the spectral range; and optically coupling a fluid chamber to the gap of the microspectrometer that measures an optical property of a fluid within the chamber.

2. The process of claim 1 further comprising the step of forming nickel springs at the base of the substrate.

3. The process of claim 2 further comprising the step of electroplating a gold layer after the springs have been defined.

4. The process of claim 1 further comprising:

forming a plurality of detectors with the semiconductor substrate;

forming a plurality of lower mirrors over the substrate;

forming a sacrificial layer over each lower mirror;

forming a plurality of bridge structures over the sacrificial layer and which are positioned over each lower mirror;

forming a second layer on each bridge such that each bridge defines an upper mirror; and selectively removing at least a portion of the sacrificial layer from underneath each bridge and each lower mirror such that a gap is provided between a lower surface of each bridge and each lower mirror.

5. The process of claim 4 further comprising forming a plurality of actuators in the semiconductor substrate to actuate movement of each bridge structure.

6. The process of claim 1 further comprising forming a plurality of bias elements that support the bridge relative to the substrate.

7. The process of claim 1 wherein said bridge forming steps further comprises forming a plurality of folded metal springs to support the bridge relative to the substrate.

8. The process of claims 1 wherein the process further comprises forming a microspectrometer having an area of about 30 $\mu$m×30 $\mu$m.

9. The process of claim 1 further comprising forming an actuator to move the bridge structure.

10. The process of claim 9 wherein the actuator forming step further comprises forming electrostatic force plate such that the actuator causes movement of said bridge relative to said detector by providing an electric field.

11. The process of claim 9 further comprising forming a drive circuit in the substrate that is electrically connected to the actuator.

12. The process of claim 1 wherein said detector forming step comprises forming a set of electrodes under said bridge such that the position of said bridge can be determined by measuring capacitance between said electrodes and said bridge.

13. The process of claim 1 further comprising forming the detector in a silicon substrate and wherein the step of forming the lower mirror includes forming a silicon dioxide layer over the silicon substrate and forming a layer of silicon over the silicon dioxide layer.

14. The process of claim 1 further comprising forming a plurality of silicon dioxide layers on the bridge structure.

15. The process of claim 1 wherein the microspectrometer has a wavelength resolution of at least 16 nm.

16. A process for fabricating a scanning microspectrometer with a silicon substrate comprising the steps of:

forming a detector with the silicon substrate;

forming a lower mirror over the silicon substrate;

forming electrodes over the silicon substrate;

forming a sacrificial layer over the lower mirror;

forming a bridge structure having a silicon layer extending over the sacrificial layer and the lower mirror;

forming an upper mirror on the bridge structure, the upper mirror including a silicon layer and a second layer having a lower index of refraction than the silicon layer;

selectively removing at least a portion of the sacrificial layer from underneath the bridge structure such that a gap is provided between a lower surface of the bridge and the lower mirror, the upper mirror of the bridge structure being optically transmissive to incident radiation over a given spectral range and the detector being positioned to receive radiation from the gap, the detector generates an electrical signal correlated with the intensity of radiation incident upon the detector within the spectral range;

device processing the electrodes and bridge structure which are connected to a drive circuit formed with the silicon substrate to provide an actuator for the scanning microspectrometer, the drive circuit selectively changing the gap to alter a wavelength of light detected by the detector and thereby scan over a range of wavelengths; and optically coupling the gap of the scanning microspectrometer to a chamber to measure a fluid within the chamber.

17. The process of claim 16 further comprising the step of forming nickel springs between the substrate and a diaphragm in the bridge.

18. The process of claim 16 further comprising:
forming a plurality of detectors with the semiconductor substrate;
forming a plurality of lower mirrors in or over the substrate;
forming a sacrificial layer over each lower mirror;
forming a plurality of bridge structures over the sacrificial layer, each bridge structure being positioned over a respective lower mirror;
forming a second layer on each bridge such that each bridge defines an upper mirror; and
selectively removing at least a portion of the sacrificial layer from underneath each bridge and each lower mirror such that a gap is provided between a lower surface of each bridge and each lower mirror.

19. The process of claim 16 wherein said detector forming step comprises forming a set of electrodes under said bridge such that the position of said bridge can be determined by measuring capacitance between said electrodes and said bridge.

* * * * *

UNITED STATES PATENT AND TRADEMARK OFFICE
CERTIFICATE OF CORRECTION

PATENT NO.    : 5,909,280
DATED         : June 1, 1999
INVENTOR(S)   : Paul M. Zavracky It is certified that error appears in the above-identified patent and that said Letters Patent is hereby corrected as shown below:

Title Page,
Item [73], Assignee: "Maxam, Inc., Wilmington, Del.", should read -- Northeastern University, Boston, Mass. --;

Item [63], Related U.S. Application Data, "No. 07/356,352", should read -- No. 07/824,834 --;

Column 1,
Line 6, "07/356,352", should read -- 07/824,834 --.

Signed and Sealed this

Thirty-first Day of July, 2001

Attest:

NICHOLAS P. GODICI
Attesting Officer     Acting Director of the United States Patent and Trademark Office